US009780555B2

(12) United States Patent
Bao et al.

(10) Patent No.: US 9,780,555 B2
(45) Date of Patent: Oct. 3, 2017

(54) AIR CONDITIONER AND COMPRESSOR PROTECTION CIRCUIT THEREOF

(71) Applicant: MIDEA GROUP CO., LTD., Foshan, Guangdong (CN)

(72) Inventors: Diansheng Bao, Guangdong (CN); Jianchang Chen, Guangdong (CN)

(73) Assignee: MIDEA GROUP CO., LTD., Foshan (CN)

( * ) Notice: Subject to any disclaimer, the term of this patent is extended or adjusted under 35 U.S.C. 154(b) by 0 days.

(21) Appl. No.: 15/110,099

(22) PCT Filed: Dec. 30, 2014

(86) PCT No.: PCT/CN2014/095705
§ 371 (c)(1),
(2) Date: Jul. 6, 2016

(87) PCT Pub. No.: WO2015/149562
PCT Pub. Date: Oct. 8, 2015

(65) Prior Publication Data
US 2016/0329699 A1  Nov. 10, 2016

(30) Foreign Application Priority Data
Apr. 2, 2014  (CN) .......................... 2014 1 0132119

(51) Int. Cl.
*H02H 7/00*  (2006.01)
*H02H 7/08*  (2006.01)
(Continued)

(52) U.S. Cl.
CPC ............. *H02H 7/08* (2013.01); *F25B 49/025* (2013.01); *H02H 3/08* (2013.01); *H02H 7/09* (2013.01);
(Continued)

(58) Field of Classification Search
CPC ................ F25B 49/025; F25B 2400/77; F25B 2700/151; F24F 1/08; H02H 7/00; H02H 7/08; H02H 3/08; H02H 7/09
(Continued)

(56) References Cited
U.S. PATENT DOCUMENTS 4,045,973 A * 9/1977 Anderson ............ F24F 11/0009
318/778
4,213,103 A * 7/1980 Birt ........................ H03K 5/023
332/109
(Continued)

FOREIGN PATENT DOCUMENTS

CN  1960148 A   5/2007
CN  101895097   12/2012
(Continued)

OTHER PUBLICATIONS

1st Office Action of counterpart Chinese Patent Application No. 201410849702.7 issued on Jan. 17, 2017.
(Continued)

*Primary Examiner* — Rita Leykin

(57) ABSTRACT

An air conditioner and a compressor protection circuit thereof are provided. When overcurrent occurs in a phase current of a compressor, an overcurrent level signal is output by a voltage comparison module, and is latched and output to an intelligent power module by a signal latching module, and the intelligent power module shuts off the output of the phase current according to the overcurrent level signal, so as to achieve the overcurrent protection of the compressor; and subsequently, a conventional level signal is output to the signal latching module by the voltage comparison module, the signal latching module keeps outputting the overcurrent level signal, and outputs the conventional level signal until a latching cancel signal output by a signal processing circuit
(Continued)

is received, so that the intelligent power module starts the output of the phase current, thereby enabling the compressor to normally operate.

20 Claims, 14 Drawing Sheets

(51) Int. Cl.
*H02H 3/08* (2006.01)
*F25B 49/02* (2006.01)
*H02H 7/09* (2006.01)
*F24F 1/08* (2011.01)

(52) U.S. Cl.
CPC ........... *F24F 1/08* (2013.01); *F25B 2400/077* (2013.01); *F25B 2700/151* (2013.01)

(58) Field of Classification Search
USPC .................. 361/22, 23, 30; 318/432, 434
See application file for complete search history.

(56) References Cited

U.S. PATENT DOCUMENTS

| | | | | |
|---|---|---|---|---|
| 4,270,164 A * | 5/1981 | Wyman | .................... | H02M 1/38 318/635 |
| 4,371,824 A * | 2/1983 | Gritter | ................ | B60L 11/1803 318/681 |
| 4,439,806 A * | 3/1984 | Brajder | ................ | H02H 7/0838 361/31 |
| 5,218,283 A * | 6/1993 | Wills | ...................... | H02P 25/04 318/123 |
| 5,257,174 A * | 10/1993 | Ogiwara | ................ | H02H 7/122 310/179 |
| 5,492,273 A * | 2/1996 | Shah | .................... | F24F 11/0009 236/11 |
| 5,592,058 A * | 1/1997 | Archer | ................. | F24F 11/0009 318/400.08 |
| 5,625,276 A * | 4/1997 | Scott | .................... | B23K 9/1062 310/114 |
| 5,670,858 A * | 9/1997 | Heath | ...................... | H02H 7/08 318/768 |
| 5,689,394 A * | 11/1997 | Esser | ................. | H03K 17/0828 361/56 |
| 5,929,576 A * | 7/1999 | Yasohara | ............. | H02H 7/0833 318/400.22 |
| 5,929,611 A * | 7/1999 | Scott | ...................... | F02B 63/04 310/184 |
| 6,538,404 B2 * | 3/2003 | Kato | ................. | H02M 7/53871 318/139 |
| 6,661,681 B2 * | 12/2003 | Nakamura | ........... | H02H 7/1227 363/56.03 |
| 7,723,964 B2 * | 5/2010 | Taguchi | .............. | H02M 1/4225 323/222 |
| 8,044,699 B1 * | 10/2011 | Kelly | ............ | H03K 19/017536 327/333 |
| 2002/0152298 A1 * | 10/2002 | Kikta | .................. | H04L 12/2803 709/223 |

FOREIGN PATENT DOCUMENTS

| | | |
|---|---|---|
| CN | 101895097 B | 12/2012 |
| CN | 202797890 U | 3/2013 |
| CN | 202798550 U | 3/2013 |
| CN | 103138238 A | 6/2013 |
| CN | 203859488 U | 10/2014 |

OTHER PUBLICATIONS

International Search Report of PCT Patent Application No. PCT/CN2014/095705 issued on Mar. 6, 2015.

* cited by examiner

AIR CONDITIONER AND COMPRESSOR PROTECTION CIRCUIT THEREOF

FIELD OF THE DISCLOSURE

The present disclosure relates to the field of circuit technologies, and in particular, to an air conditioner and a compressor protection circuit of the air conditioner.

BACKGROUND OF THE DISCLOSURE

Currently, a driving scheme of an outdoor compressor of a variable frequency air conditioner is usually that a direct current bus power is achieved by rectifying and filtering an alternating current power, after the direct current bus power is treated by a power factor correction circuit to rectify a power factor of the direct current bus power, the direct current bus power powers an intelligent power module, finally the intelligent power module drives the compressor to operate directly, meanwhile, the signal processing circuit of the variable frequency air conditioner outputs a driving signal to drive the intelligent power module to operate according to corresponding phase current.

In order to protect the compressor from overcurrent, the existed technology provides a compressor current protection circuit, the compressor current protection circuit samples the phase current of the compressor, and controls a switch of the intelligent power module according to the sampled voltage, and can enable the intelligent power module to shut off the output of the phase current when the overcurrent of the compressor is too large, so that the aim of protecting the compressor can be achieved, meanwhile, the intelligent power module can output a fault protection signal to the variable frequency signal processing circuit, and enable the variable frequency signal processing circuit to stop outputting the driving signal according to the fault protection signal, until the phase current of the compressor returns to normal the intelligent power module starts and drives the compressor to work, the intelligent power module also outputs the fault cancel signal to the signal processing circuit simultaneously, so that, the signal processing circuit can output the driving signal again to drive the intelligent power module to operate normally.

However, during a period of shutting off the intelligent power module, although the signal processing circuit already stops outputting the driving signal, while if a strong interference signal exists on the drive signal line between the signal processing circuit and the intelligent power module, the intelligent power module will output a large current or be damaged, thereby the compressor cannot be protected effectively.

In conclusion, the existed technology, during the overcurrent protection process of the compressor, as the strong interference signal exists on the drive signal line between the signal processing circuit and the intelligent power module, the compressor cannot be effectively protected.

SUMMARY OF THE DISCLOSURE

The present disclosure is to provide a compressor protection circuit, which aims to solve a problem which is that the compressor cannot be protected effectively as the strong interference signal exists on the drive signal line between the signal processing circuit and the intelligent power module during a protection process of the compressor from overcurrent.

The present disclosure is accomplished as follows: a compressor protection circuit, which includes a current sampling module, a reference voltage generating module, a voltage comparison module and an intelligent power module, the current comparison sampling module samples a phase current of the compressor and outputs corresponding sampling voltage signal to a first input end of the voltage comparison module, the reference voltage generating module outputs a reference voltage signal to a second input end of the voltage comparison module, the voltage comparison module compares the sampling voltage signal with the reference voltage signal; the intelligent power module controls a working condition of the compressor according to a driving signal outputted by a signal processing circuit, when the intelligent power module shuts off the output, the intelligent power module outputs a fault protecting signal simultaneously, so that the signal processing circuit stops outputting the driving signal; the compressor protection circuit further includes a signal latching module;

An output end of the voltage comparison module is connected with an input end of the signal latching module, an output end of the signal latching module is connected with a testing port for protecting trigger voltage of the intelligent power module, a latching-controlling end of the signal latching module is connected with the signal processing circuit; when the sampling voltage signal is higher than the reference voltage signal, the voltage comparison module outputs an overcurrent level signal to the signal latching module, the signal latching module latches and outputs the overcurrent level signal to the intelligent power module according to the overcurrent level signal, so that the intelligent power module shuts off the output of the phase power; when the signal processing circuit outputs a latching cancel signal to the signal latching module, the signal latching module outputs a conventional level signal to the intelligent power module according to the latching cancel signal, the intelligent power module drives the compressor to operate according to the conventional level signal and a driving signal outputted by the signal processing circuit.

Another aim of the present disclosure is to provide an air conditioner, which includes a signal processing circuit, a compressor and the compressor protection circuit.

The present disclosure adopts the signal latching module in the compressor protection circuit having the current sampling module, the reference voltage generating module, the voltage comparison module and the intelligent power module, when the phase current of the compressor occurs overcurrent, the voltage comparison module outputs the overcurrent level signal which can be latched and outputted to the intelligent power module through the signal latching module, the intelligent power module shuts off the output of the phase current according to the overcurrent level signal, so as to achieve the overcurrent protection of the compressor, then the voltage comparison module outputs the conventional level signal to the signal latching module, while the signal latching module still keeps outputting the overcurrent level signal, the signal latching module outputs the conventional level signal until the latching cancel signal outputted by the signal processing circuit is received, so that the intelligent power module starts to output the phase current, thereby enabling the compressor to normally operate. In this way, when the strong interference signal exists on the drive signal line between the signal processing circuit and the intelligent power module, the intelligent power module can be prevented from outputting the large current or being damaged, thereby achieving the purpose of effectively protecting the compressor.

The realizing of the aim, functional characteristics, advantages of the present disclosure are further described in detail with reference to the accompanying drawings and the embodiments.

DETAILED DESCRIPTION OF THE EMBODIMENTS

It is to be understood that, the described embodiments are only some exemplary embodiments of the present disclosure, and the present disclosure is not limited to such embodiments.

A compressor protection circuit provided by an exemplary embodiment of the present disclosure is illustrated through an example of which the compressor protection circuit is applied in an air conditioner.

The air conditioner includes a signal processing circuit, a compressor and the compressor protection circuit.

Figure 1:
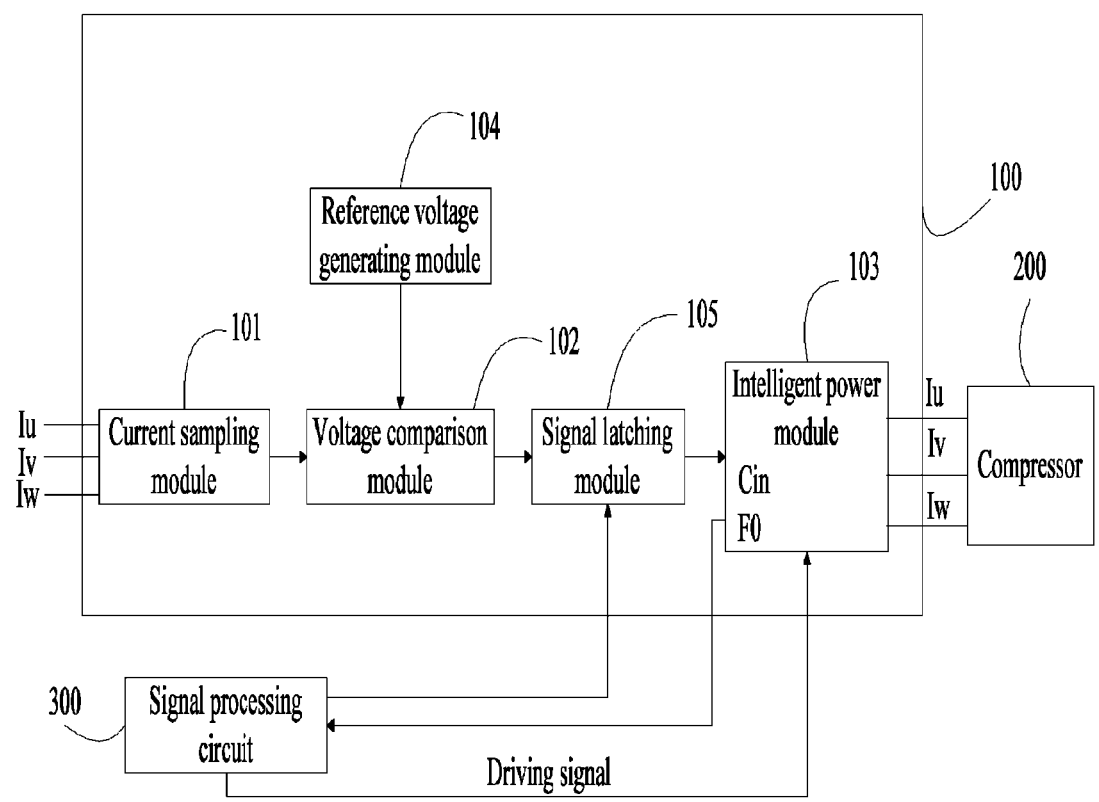
FIG. 1 is a module structure diagram of the compressor protection circuit provided by an exemplary embodiment of the present disclosure.

FIG. 1 shows a module structure diagram of the compressor protection circuit provided by an exemplary embodiment of the present disclosure, for demonstration purposes, portions related with the exemplary embodiment of the present disclosure are described as follows:

The compressor protection circuit 100 provided by exemplary embodiment of the present disclosure includes a current sampling module 101, a reference voltage generating module 104, a voltage comparison module 102 and an intelligent power module 103, the current sampling module 101 samples a phase current of the compressor 200, and outputs a corresponding sampling voltage signal to a first input end of the voltage comparison module 102, the reference voltage generating module 104 outputs a reference voltage signal to a second input end of the voltage comparison module 102, the voltage comparison module 102 compares the sampling voltage signal with the reference voltage signal; the intelligent power module 103 controls a working condition of the compressor 200 according to a driving signal outputted by a signal processing circuit 300, an output pin for fault signal F0 of the intelligent power module 103 connects with the signal processing circuit 200, when the intelligent power module 103 shuts off the output, the intelligent power module 103 outputs a fault protecting signal simultaneously, so that the signal processing circuit 300 stops outputting the driving signal.

The compressor protection circuit 100 further includes a signal latching module 105. The output end of the voltage comparison module 102 is connected with the input end of the signal latching module 105, the output end and a latching-controlling end of the signal latching module 105 are connected with a testing port for protecting trigger voltage Cin of the intelligent power module 103 and the signal processing circuit 300 respectively.

When the sampling voltage signal is higher than the reference voltage signal, the voltage comparison module 102 outputs an overcurrent level signal to the signal latching module 105, after the overcurrent level signal is latched by the signal latching module 105, the latched overcurrent level signal is outputted to the intelligent power module 103 continuously, the intelligent power module 103 shuts off the output of the phase current according to the overcurrent level signal, and outputs a fault protecting signal to the signal processing circuit 300 simultaneously; after the intelligent power module 103 shuts off the output of the phase current, if the sampling voltage signal is lower than the reference voltage signal, the voltage comparison module 102 outputs a conventional level signal to the signal latching module 105, the signal latching module 105 still keeps outputting the overcurrent level signal when the signal latching module 105 has not received a latching cancel signal outputted by the signal processing circuit 300, when the signal processing circuit 300 outputs the latching cancel signal, the signal latching module 105 outputs the conventional level signal to the intelligent power module 103 according to the latching cancel signal, the intelligent power module 103 drives the compressor 200 to work according to the conventional level signal and a driving signal outputted by the signal processing circuit 300. The conventional level signal can be defined as a non-protection signal outputted to the intelligent power module 103 under a normal state without a happening of current protecting. The latching cancel signal can be defined as a level signal outputted to the signal latching module 105 when a fault recoveries after a happening of a current protection due to the fault, so that the latching of the overcurrent level signal is canceled.

And, the signal processing circuit 300 can output the latching cancel signal for the signal latching module 105 to cancel the latching of the overcurrent level signal when a state of a control circuit of the air conditioner is stable or a fault of the control circuit is removed (includes that the driving signal line between the signal processing circuit 300 and the intelligent power module 103 occurs a strong interference signal), at this time, the intelligent power module 103 can drive the compressor 200 according to the conventional level signal and the driving signal outputted by the signal processing circuit 300.

Figure 2:
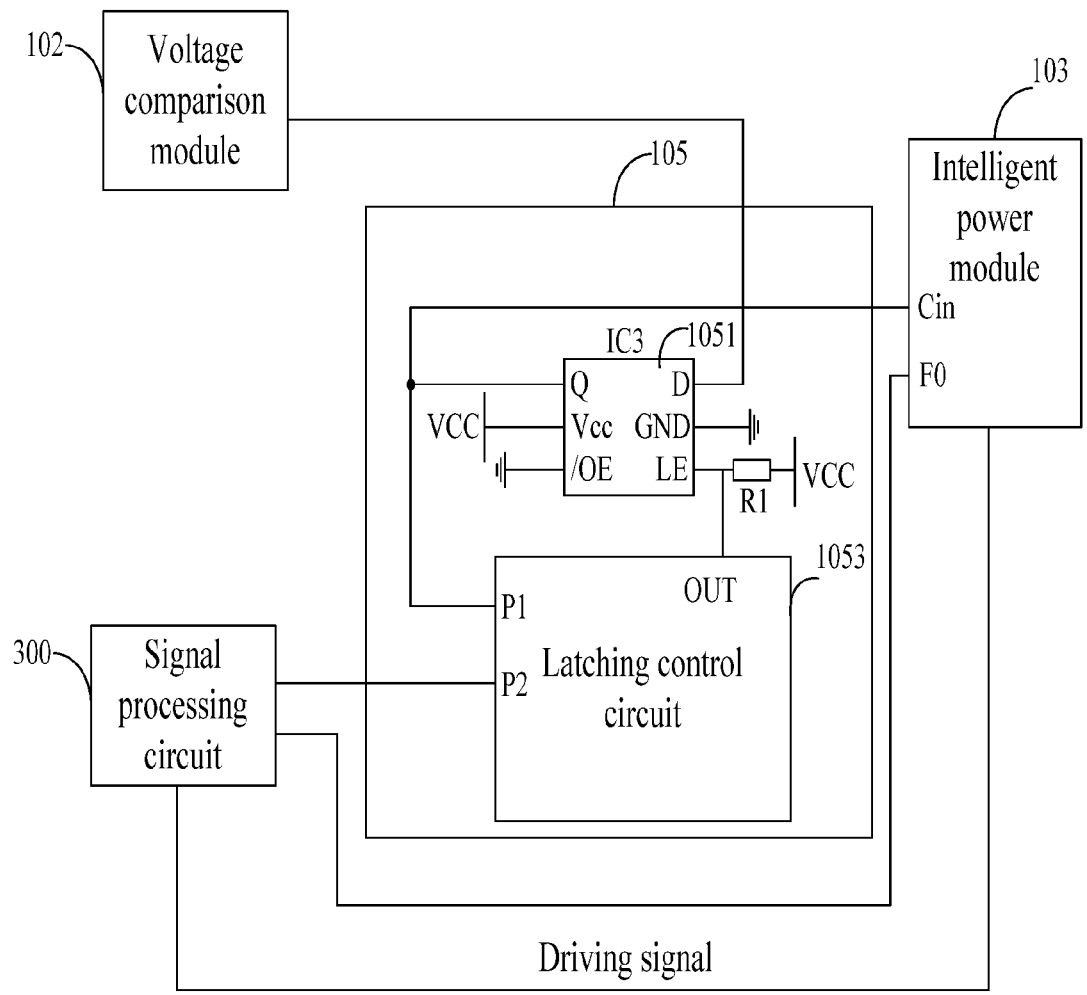
FIG. 2 is a connection structure diagram of the signal latching module, signal processing circuit, and the intelligent power module of the compressor protection circuit provided by another exemplary embodiment of the present disclosure.

Furthermore, referring to FIG. 2, the signal latching module 105 can include a latch 1051, a latching-controlling circuit 1053. In an exemplary embodiment, the latch 1051 can be a D trigger, the present disclosure is not limited to the D trigger, any latch having the same function can be within the protection scope of the present disclosure. The latch 1051 includes a signal input pin D, a signal output pin Q and a signal control pin LE. And, the signal input pin D of the latch 1051 can be defined as the input end of the signal latching module 105, the signal output pin can be defined as the output end of the signal latching module 105. The latching-controlling circuit 1053 includes a first input end P1, a second input end P2 and an output end OUT. And the first input end P1 of the latching-controlling circuit 1053 is connected with the signal input pin of the signal latching module 105, the second input end P2 of the latching-controlling circuit 1053 can be defined as the latching-controlling end of the signal latching module 105 and is connected with the output end of the signal processing circuit 300 outputting the latching cancel signal, the output end OUT of the latching-controlling circuit 1053 is connected with the signal control pin of the latch 1051.

The signal input pin D of the latch 1051 can be connected with the output end of the voltage comparison module 102. When the sampling voltage signal is higher than the reference voltage signal, the voltage comparison module 102 will output the overcurrent level signal, at this time, if the signal control pin LE of the latch 1051 has not received the latching signal, the latch 1051 outputs the level signal consistent with the overcurrent level signal, that is the overcurrent level signal. Such as, the overcurrent level signal is a high level signal, the latch 1051 also outputs the high level signal. The overcurrent level signal outputted by the latch 1051 can be outputted to the intelligent power module 103 continuously, the intelligent power module 103 shuts off the output of the phase signal according to the overcurrent level signal, and outputs the fault protection signal to the signal processing signal 300 simultaneously, so that the signal processing circuit 300 stops outputting the driving signal. Meanwhile, the overcurrent level signal outputted by the latch 1051 is outputted to the latching-controlling circuit 1053 continuously, the latching-controlling circuit 1053 outputs the latching signal to the control end of the latch 1051 according to the overcurrent level signal, so that the latch 1051 keeps outputting the overcurrent level signal.

When the state of the air conditioner is stable or the fault of the control circuit is removed (includes that the driving signal line between the signal processing circuit 300 and the intelligent power module 103 occurs the strong interference signal), the signal processing circuit 300 outputs the latching cancel signal, the signal processing circuit 300 generates the driving signal simultaneously to drive the compressor. The latching-controlling circuit 1053 outputs the latching cancel signal to the control end of the latch 1051 according to the latching cancel signal, so that the latch 1051 cancels the latching of the overcurrent level signal, at this time, the intelligent power module 103 can drive the compressor 200 according to the conventional level signal and the driving signal outputted by the signal processing circuit 300.

Figure 3:
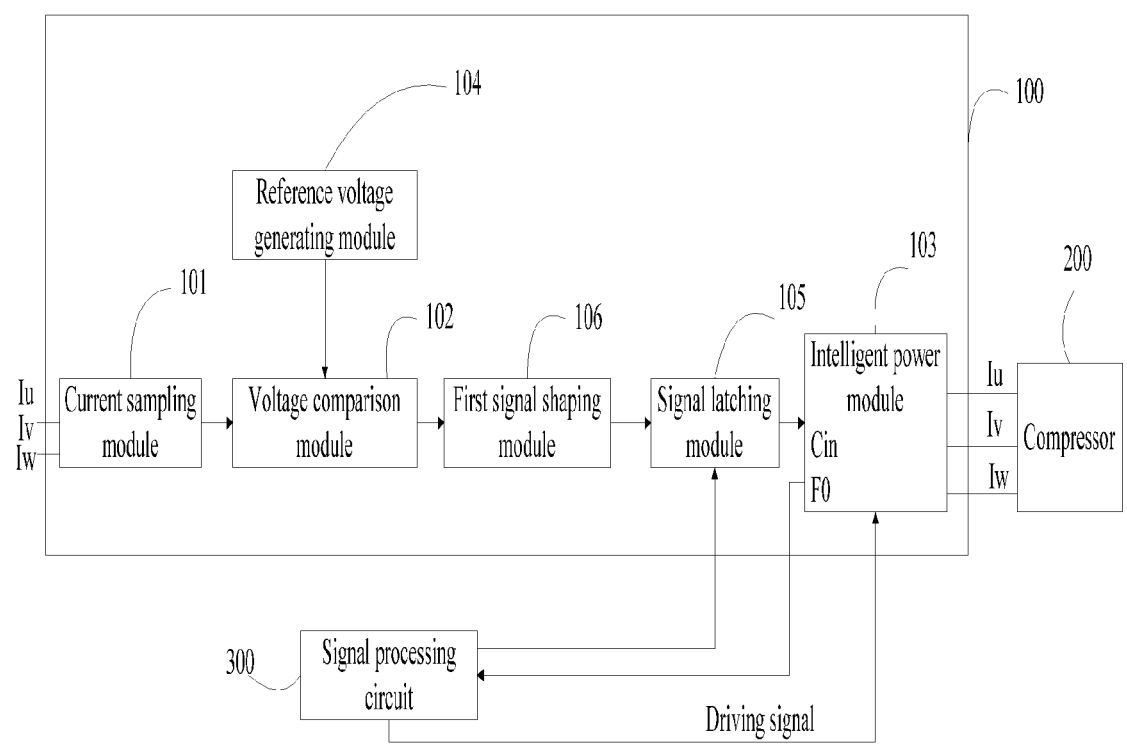
FIG. 3 is a module structure diagram of the compressor protection circuit provided by another exemplary embodiment of the present disclosure.

In another exemplary embodiment of the present disclosure, based on the compressor protection circuit shown in FIG. 1, the compressor protection circuit 100 further includes a first signal shaping module 106, referring to FIG. 3, an input end and an output end of the first signal shaping module 106 are connected with the output end of the voltage comparison module 102 and the input end of the signal latching module 105 respectively, the first signal shaping module 106 can shape the overcurrent level signal outputted by the voltage comparison module 102 or the conventional level signal and output the shaped overcurrent level signal or shaped conventional level signal to the signal latching module 105.

When the sampling voltage signal is higher than the reference voltage signal, the voltage comparison module 102 outputs the overcurrent level signal to the first signal shaping module 106, the first signal shaping module 106 shapes the overcurrent level signal and outputs the shaped overcurrent level signal to the signal latching module 105, after the signal latching module 105 latches the overcurrent level signal, the signal latching module 105 outputs the overcurrent level signal to the intelligent power module continuously, the intelligent power module shuts off the output of the phase current according to the overcurrent level signal, and outputs the fault protection signal to the signal processing circuit 300 simultaneously; after the intelligent power module 103 shuts off the output of the phase current, if the sampling voltage signal is lower than the reference voltage signal, the voltage comparison module 102 outputs the conventional level signal to the first signal shaping module 106, the first signal shaping module 106 shapes the conventional level signal and outputs the shaped conventional level signal to the signal latching module 105, when the signal processing circuit 300 has not received the latching cancel signal outputted by the signal processing circuit 300, the signal latching module 105 still keeps outputting the shaped overcurrent level signal, when the signal processing circuit 300 outputs the latching cancel signal, the signal latching module 105 outputs the shaped conventional level signal to the intelligent power module 103 according to the latching cancel signal, the intelligent power module 103 drives the compressor 200 according to the conventional level signal and the driving signal outputted by the signal processing circuit 300.

In detail, the first signal shaping module 106 can amplify, separate and reverse the overcurrent level signal or the conventional level signal outputted by the voltage comparison module 102, then output the overcurrent level signal or the conventional level signal to the signal latching module 105.

Figure 4:
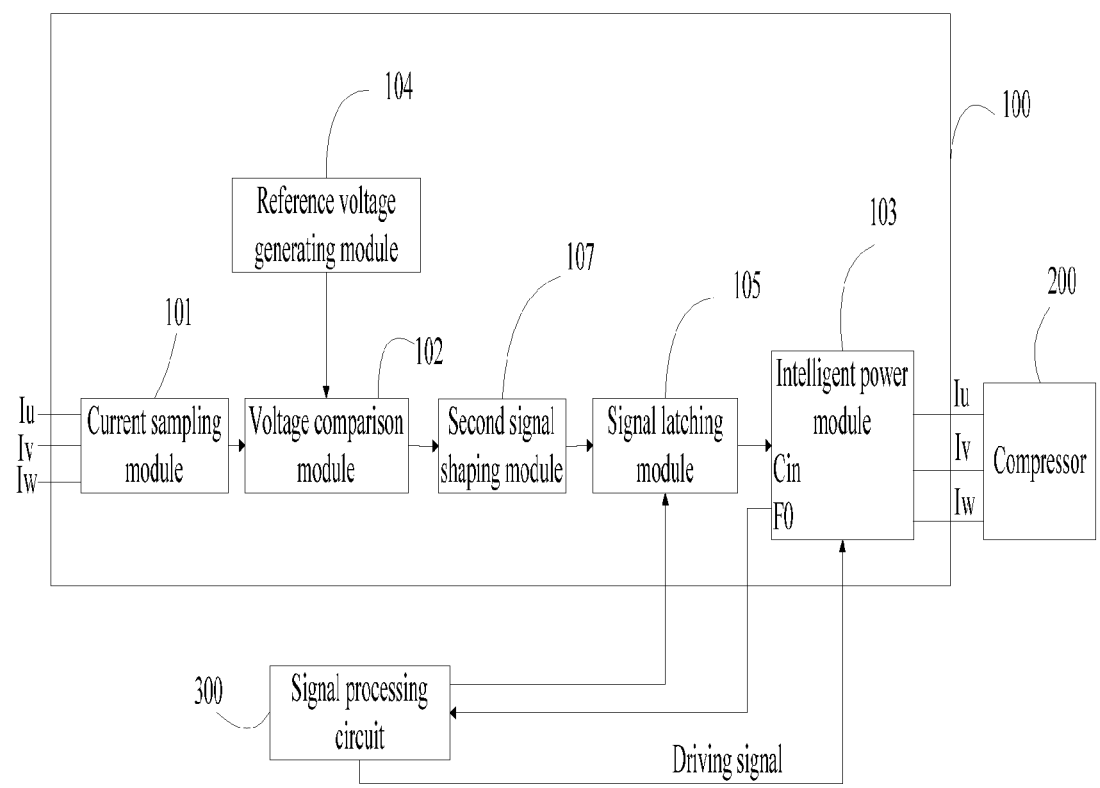
FIG. 4 is a module structure diagram of the compressor protection circuit provided by another one exemplary embodiment of the present disclosure.

In another exemplary embodiment, based on the compressor protection circuit shown in FIG. 1, the processor protection circuit 100 further includes a second signal shaping module 107, referring to FIG. 4, an input end and an output end of the second signal shaping module 107 can be connected with the output end of the voltage comparison module 102 and the input end of the signal latching module 105 respectively, at an initial time of powering the processor protection circuit 100, the second signal shaping module 107 outputs the overcurrent level signal by itself and controls the intelligent power module 103 to shut off the output of the phase current through the signal latching module 105, and after the voltage comparison module 102 outputs the overcurrent level signal or the conventional level signal, the second signal shaping module 107 shapes the overcurrent level signal or the conventional level signal outputted by the voltage comparison module 102 and then outputs the shaped overcurrent level signal or the shaped conventional level signal to the signal latching module 105.

At the initial time of powering the processor protection circuit 100, the second signal shaping module 107 outputs the overcurrent level signal to the signal latching module 105, the signal latching module 105 controls the intelligent power module to shut off the output of the phase current, in this way, when the strong interference signal exists on the drive signal line between the signal processing circuit and the intelligent power module, the intelligent power module can be prevented from outputting a large current or being damaged, thereby achieving the purpose of effectively protecting the compressor; after being powered, the voltage comparison module 102 outputs the overcurrent level signal or the conventional level signal according to a comparison result of the sampling voltage and the reference voltage, when the sampling voltage signal is higher than the reference voltage signal, the voltage comparison module 102 outputs the overcurrent level signal to the second signal shaping module 107, the second signal shaping module 107 shapes the overcurrent level signal and outputs the shaped overcurrent level signal to the signal latching module 105, the signal latching module 105 latches the overcurrent level signal and outputs the overcurrent level signal to the intelligent power module 103, the intelligent power module 103 can shut off the phase current according to the overcurrent level signal, and outputs the fault protection signal to the signal processing circuit 300 simultaneously; after the intelligent power module 103 shuts off the output of the phase current, if the sampling voltage signal is lower than the reference voltage signal, the voltage comparison module 102 outputs the conventional level signal to the second signal shaping module 107, the second signal shaping module 107 shapes the conventional level signal and outputs the shaped conventional level signal to the signal latching module 105, when the latching cancel signal outputted by the signal processing circuit 300 is not received, the signal latching module 105 still keeps outputting the shaped overcurrent level signal, when the signal processing circuit 300 outputs the latching cancel signal, the signal latching module 105 outputs the shaped conventional level signal to the intelligent power module 103 according to the latching cancel signal, the intelligent power module 103 drives the compressor 200 to work according to the conventional level signal and the driving signal outputted by the signal processing circuit 200.

In detail, the second signal shaping module 107 can amplify and separate the overcurrent level signal or the conventional level signal outputted by the voltage comparison module 102 and then output the shaped overcurrent signal or the shaped conventional level signal to the signal latching module 105.

Figure 5:
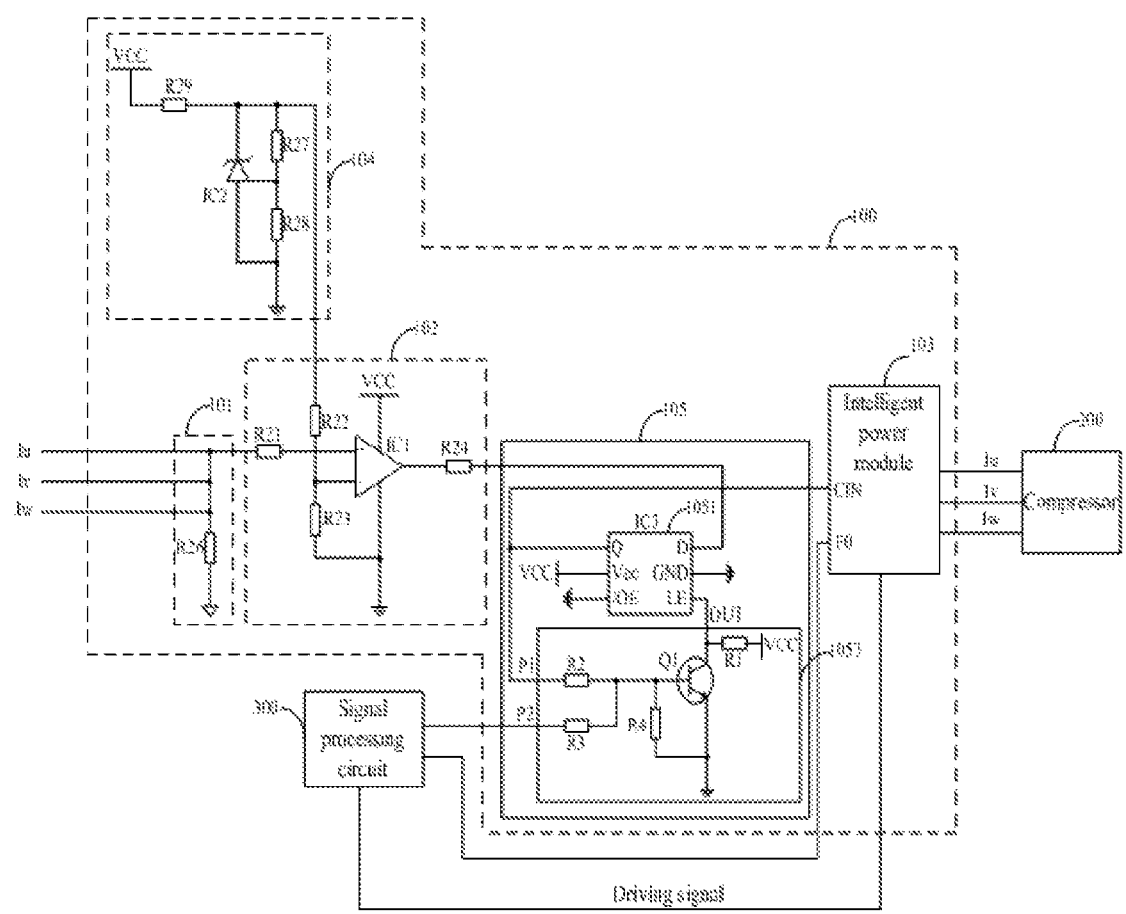
FIG. 5 is a circuit structure diagram of the compressor protection circuit shown in FIG. 2 according to a first exemplary embodiment.

FIG. 5 shows a sampled circuit structure diagram of the compressor protection circuit shown in FIG. 2 according to a first exemplary embodiment, for illustrative purposes, FIG. 5 only shows parts related to the exemplary embodiment of the present disclosure, which are described below:

The signal sampling module 101 includes a twenty-sixth resistor R26, a first input end of the twenty-sixth resistor R26 is connected with a three-phase current (Iu, Iv and Iw) of the compressor 200, and connected with the first input end of the voltage comparison module 102, a second input end of the twenty-sixth resistor is grounded. The twenty-sixth resistor R26 samples the three-phase current of the compressor 200 and generates the corresponding sampling voltage signal.

The voltage comparison module 102 includes: a twenty-first resistor R21, a twenty-second resistor R22, a twenty-third resistor R23, a first comparator IC1, a twenty-fourth resistor R24.

In detail, a first end of the twenty-first resistor R21 and a first end of the twenty-second resistor R22 can be defined as the first input end and the second input end of the voltage comparison module 102 respectively, a second end of the twenty-first resistor R21 is connected with an in-phase input end of the first comparator IC1, a second end of the twenty-second resistor R22 and a first end of the twenty-third resistor R23 are jointly connected with an anti-phase input end of the first comparator IC1, a positive power end of the first comparator IC1 is connected with the direct current power VCC, a negative power end of the first comparator IC1 and a second end of the twenty-third resistor R23 are jointly grounded, an output end of the first comparator IC1 is connected with a first end of the twenty-fourth resistor R24, a second end of the twenty-fourth resistor R24 is the output end of the voltage comparison module 102.

The intelligent power module 103 can be an existed intelligent power module (that is, IPM) which includes a controller and an upper and lower bridge arm switch tube.

The reference voltage generating module 104 includes: a twenty-seventh resistor R27, a reference voltage source chip IC2, a twenty-eighth resistor R28 and a twenty-ninth resistor R29.

In detail, a first end of the twenty-ninth resistor R29 is connected with the direct current power VCC, a second end of the twenty-ninth resistor R29, a cathode of the reference voltage source chip IC2 and a first end of the twenty-seventh resistor R27 are jointly connected with each other to form a junction which can be defined as the output end of the reference voltage generating module 104, a regulating pole of the reference voltage source chip IC2 and a second end of the twenty-seventh resistor R27 are jointly connected with a first end of the twenty-eighth resistor R28, an anode of the reference voltage source chip IC2 and a second end of the twenty-eighth resistor R28 are jointly grounded. And, the reference voltage source chip IC2 can be a reference voltage source, a model of the reference voltage source can be TL431.

The signal latching module 105 includes: a latch IC3, a first resistor R1, a second resistor R2, a third resistor R3, a fourth resistor R4, a first transistor Q1. In an exemplary embodiment, the first transistor can be a NPN transistor.

A signal input pin D of the third resistor IC3 can be the input end of the signal latching module 105, a junction of a signal output pin Q of the latch IC3 and a first end of the resistor R2 can be the output end of the signal latching module 105, a power pin Vcc of the latch IC3 can be connected with the direct current power VCC, a ground pin GND an output enable pin/OE of the latch IC3 and are both grounded, a first end of the third resistor R3 can be defined as the latching-controlling end of the signal latching module 105, a second end of the second resistor R2, a second end of the third resistor R3, a first end of the fourth resistor R11 are jointly connected with a base of the first transistor Q1, a second end of the fourth resistor R4 and an emitter of the first transistor Q1 are jointly grounded, a collector of the first transistor Q1 and a first end of the first resistor R1 can be jointly connected with the signal control pin LE of the latch IC3, a second end of the first resistor R1 is connected with the direct current power VCC. And, logical relationships among the signal input pin D, output enable pin/OE and signal control pin LE of the latch IC3 and the signal output pin Q are as follows in this table:

TABLE 1

| /OE | LE | D | Q |
|---|---|---|---|
| L | H | L | L |
| L | H | H | H |

TABLE 1-continued

| /OE | LE | D | Q |
|-----|----|---|---|
| L | L | x | Q0 |
| H | x | x | Z |

In the table 1, L can be defined as the low level signal, H can be defined as the high level signal, x can be defined as no input signal, Q0 can be defined as a last signal outputted by the output pin Q of the latch IC3, Z can be defined as zero level.

In additional, the latch IC 3 can be a latching chip, a model of the latching chip can be SN74LVC1G373.

The compressor protection circuit shown in FIG. 5 can be further described combining with the operating principle:

When the phase current (that is, the phase current outputted by the intelligent power module 103) of the compressor 200 increases to make the voltage on the first resistor R1 higher than voltage on the in-phase input end of the first comparator IC1, at this time, the first comparator IC1 can output the high level signal (that is, the overcurrent level signal) to the signal input pin D of the latch IC3. According to the operation principle of the latch, at this time, the signal output pin Q of the latch IC3 can output the high level signal received by the signal input pin D to the testing port for protecting trigger voltage Cin of the intelligent power module 103, and the intelligent power module 103 can shut off the output of the phase current to control the compressor 200 to go down immediately. Meanwhile, the high level signal outputted by the signal output pin Q of the latch IC3 can also be inputted to the base of the NPN transistor Q1 through the second resistor R2, so that the NPN transistor Q1 is breakover, and the signal control pin LE of the latch IC3 changes to low level corresponding. According to the operating principle of the latch, the latching function of the latch IC3 begins to take effect, no matter what would happen to the signal of the signal input pin D of the latch IC3, the signal outputted by the signal output pin Q of the latch IC3 remain unchanged by the latch IC3, that is, the signal output pin Q of the latch IC3 outputs the high level signal continuously, and the intelligent power module 103 shuts off the output of the phase current continuously to control the compressor 200 to go down. Meanwhile, the fault signal output pin F0 of the intelligent power module 103 can output a level pulse signal (that is the fault protection signal) to the signal processing circuit 300, the signal processing circuit 300 shuts off the output of the driving signal according to the level pulse signal. As the compressor 200 stops working, the voltage on the twenty-sixth resistor R26 is zero, and the first comparator IC1 outputs the low level signal (that is the conventional level signal) to the signal input pin D of the latch IC3, while the latching function of the latch IC3 still works, so the signal output pin Q of the latch IC3 still outputs high level signal, and further makes the intelligent power module 103 to shut off the output of phase current to control the compressor 200 to go down. During the time, as the intelligent power module 103 is in the off state, so if the drive signal line between the signal processing circuit 300 and the intelligent power module 103 is affected by the strong interference signal, the intelligent power module 103 can be prevented from outputting the large current or being damaged, thereby achieving the purpose of effectively protecting the compressor 200. When the state of the control circuit of the air conditioner is stably or the fault is removed (such as, the voltage and current of the input power are normal), the signal processing circuit 300 can output the low level signal (that is the latching cancel signal) to the latch IC3 after delaying a preset time (such as 30 seconds), the low level signal is inputted to the NPN transistor Q1 through the third resistor R3, so that the NPN transistor Q1 ends, and the signal control pin LE of the latch IC3 transfers to high level, the latching function of the latch IC3 is void. At this time according to the operation principle of the latch, the signal outputted by the signal output pin Q of the latch IC3 is consistence with the signal inputted by the signal input pin D of the latch IC3, that is, the signal output pin Q of the latch IC3 can output the low level signal to the intelligent power module 103, and the intelligent power module 103 resumes the output of the phase current, so that the compressor 200 starts normally.

Figure 6:
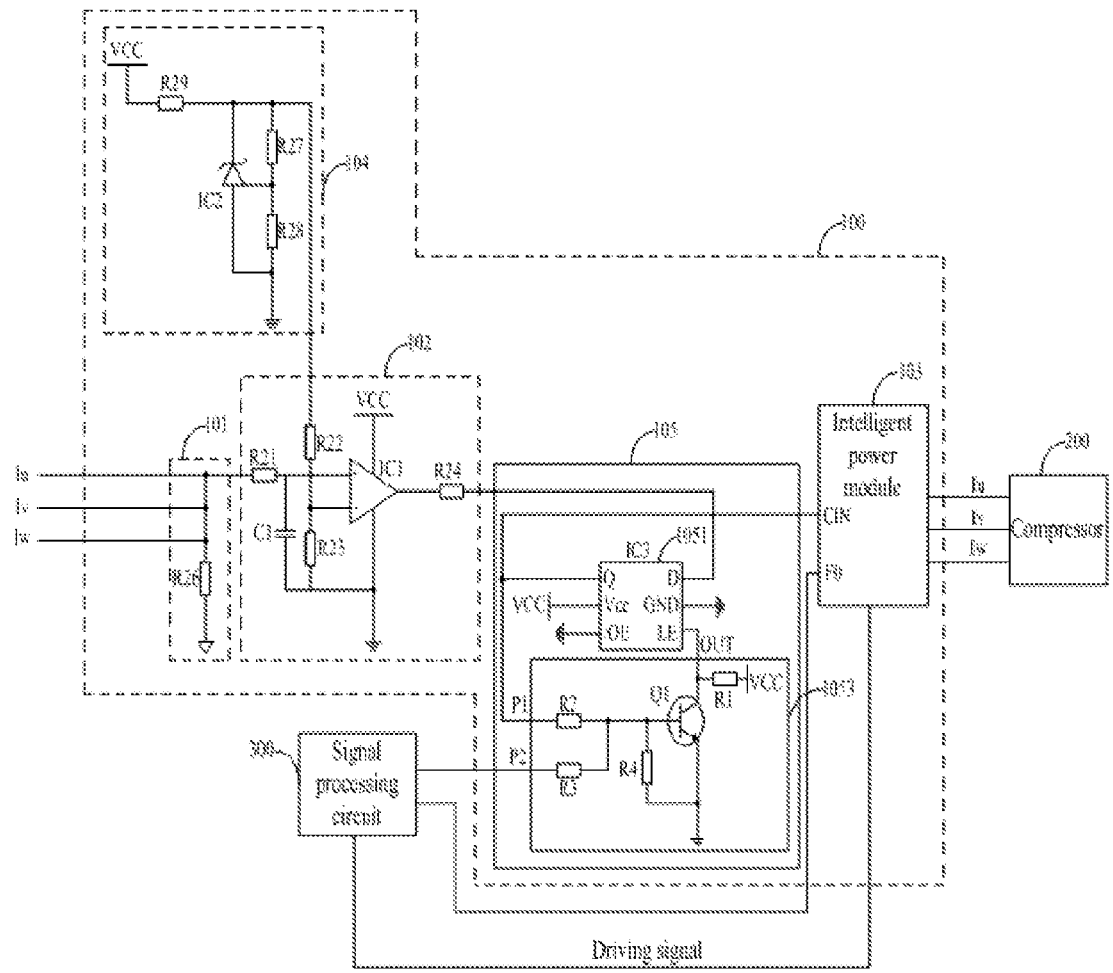
FIG. 6 is a circuit structure diagram of the voltage comparison module of the compressor protection circuit shown in FIG. 2.

In addition, referring to FIG. 6, the voltage comparison module 102 further includes a first capacitor IC1, the first capacitor IC1 is connected between the in-phase input end of the first comparator IC1 and the ground, the first capacitor IC1 can be used for filtering an input signal of the in-phase input end of the first comparator IC1.

therefore, the exemplary embodiment of the present disclosure adopts the signal latching module 105 in the compressor protection circuit having the current sampling module 101, the reference voltage generating module 104, the voltage comparison module 102 and the intelligent power module 103, when the phase current compressor 200 occurs overcurrent, the voltage comparison module 102 outputs the overcurrent level signal which can be latched and outputted to the intelligent power module 103 through the signal latching module 105, the intelligent power module 103 shuts off the output of the phase current according to the overcurrent level signal, so as to achieve the overcurrent protection of the compressor 200, then the voltage comparison module 102 outputs the conventional level signal to the signal latching module 105, while the signal latching module 105 still keeps outputting the overcurrent level signal, the signal latching module 105 outputs the conventional level signal until the latching cancel signal output by a signal processing circuit 300 is received, so that the intelligent power module 103 starts to output the phase current, thereby enabling the compressor 200 to normally operate. In this way, when the strong interference signal exists on the drive signal line between the signal processing circuit 300 and the intelligent power module 103, the intelligent power module 103 can be prevented from outputting the large current or being damaged, thereby achieving the purpose of effectively protecting the compressor 200.

Figure 7:
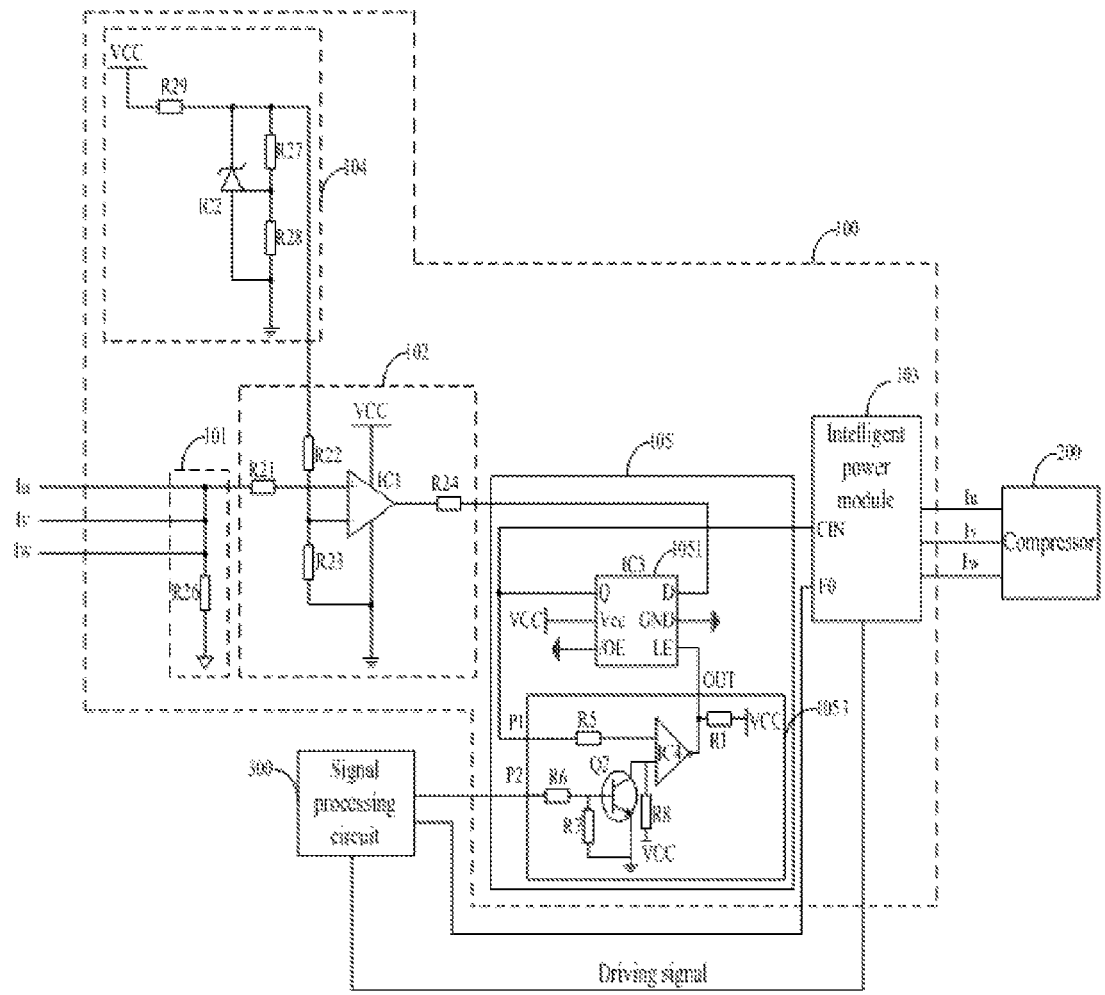
FIG. 7 is a circuit structure diagram of the compressor protection circuit shown in FIG. 2 according to a second exemplary embodiment.

FIG. 7 shows a sampled circuit structure diagram of the compressor protection circuit shown in FIG. 2 according to a second exemplary embodiment, for illustrative purposes. For illustrative purposes, FIG. 7 only shows parts related to the exemplary embodiment of the present disclosure. Among them, the structures of the current sampling module 101, the voltage comparison module 102, the intelligent power module 103, the reference voltage generating module 104 are all the same with the structures shown in FIG. 4, so no need to repeat herein. A difference between the first exemplary embodiment and the second exemplary embodiment is that a circuit structure of the latching-controlling of the signal latching module 105. In the exemplary embodiment, the latching control circuit 1053 includes: a nand gate IC4, a second transistor Q2, a first resistor R1, a fifth resistor R5, a sixth resistor R6, a seventh resistor R7, a eighth resistor R8.

In detail, a first end of the fifth resistor R5 is connected with the signal output pin D of the latch IC3, a second end of the fifth resistor R5 is connected with a first input end of the nand gate IC4; a first end of the sixth resistor R6 is connected with the signal processing circuit, a second end of the sixth resistor R6 and a first end of the seventh resistor R7 are jointly connected with a base of the second transistor Q2, a second end of the seventh resistor R7 and an emitter of the second transistor Q2 are jointly grounded, a collector of the second transistor Q2 and a first end of the resistor R8 are jointly connected with a second input end of the nand gate IC4, a second end of the resistor R8 is connected with the direct current power VCC; an output end of the nand gate IC4 and a first end of the resistor R1 are jointly connected with the signal control pin LE of the latch 1051, a second end of the resistor R1 is connected with the direct current power VCC.

The compressor protection circuit shown in FIG. 7 can be further described combining with the operating principle:

When the phase current (that is, the phase current outputted by the intelligent power module 103) of the compressor 200 increases to make the voltage on the first resistor R1 higher than voltage on the in-phase input end of the first comparator IC1, at this time, the first comparator IC1 can output the high level signal (that is, the overcurrent level signal) to the signal input pin D of the latch IC3. According to the operation principle of the latch, at this time, the signal output pin Q of the latch IC3 can output the high level signal received by the signal input pin D to the testing port for protecting trigger voltage Cin of the intelligent power module 103, and the intelligent power module 103 can shut off the output of the phase current to control the compressor 200 to go down immediately. Meanwhile, the high level signal outputted by the signal output pin Q of the latch IC3 can also be inputted to the first input end of the nand gate IC4. While when the signal processing circuit 300 does not output the latching cancel signal, the signal processing circuit 300 always outputs the low level signal, the low level signal is transferred tot the NPN transistor Q2 through the sixth resistor R6, the NPN transistor Q2 ends, that is, the second input end of the nand gate IC4 inputs the high level signal. According to the operating principle of the nand gate IC4, the nand gate IC4 outputs the low level signal, that is, the signal control pin LE of the latch IC3 transfers to the low level corresponding. According to the operating principle of the latch, the latching function of the latch IC3 begins to effect, no matter what would happen to the signal of the signal input pin D of the latch IC3, the signal outputted by the signal output pin Q of the latch IC3 remain unchanged by the latch IC3, that is, the signal output pin Q of the latch IC3 outputs the high level signal continuously, and the intelligent power module 103 shuts off the output of the phase current continuously to control the compressor 200 to go down. Meanwhile, the fault signal output pin F0 of the intelligent power module 103 can output a level pulse signal (that is the fault protection signal) to the signal processing circuit 300, the signal processing circuit 300 shuts off the output of the driving signal according to the level pulse signal. As the compressor 200 stops working, the voltage on the twenty-sixth resistor R26 is zero, and the first comparator IC1 outputs the low level signal (that is the conventional level signal) to the signal input pin D of the latch IC3, while the latching function of the latch IC3 still works, so the signal output pin Q of the latch IC3 still outputs high level signal, and further makes the intelligent power module 103 to shut off the output of phase current to control the compressor 200 to go down. During the time, as the intelligent power module 103 is in the off state, so if the drive signal line between the signal processing circuit 300 and the intelligent power module 103 is affected by the strong interference signal, the intelligent power module 103 can be prevented from outputting the large current or being damaged, thereby achieving the purpose of effectively protecting the compressor 200. When the state of the control circuit of the air conditioner is stably or the fault is removed (such as, the voltage and the current of the input power are normal), the signal processing circuit 300 can output the high level signal (that is the latching cancel signal) to the latch IC3 after delaying the preset time (such as 30 seconds), the high level signal is inputted to the NPN transistor Q2 through the sixth resistor R6, so that the NPN transistor Q2 is breakover, that is, the second input end of the nand gate IC4 inputs the low level signal, at this time according to the operation principle of the nand gate, the nand gate IC4 outputs the high level signal, that is, the signal control pin LE of the latch IC3 transfers to the high level, the latching function of the latch IC3 is void. According to the operation principle of the latch, the signal outputted by the signal output pin Q of the latch IC3 is consistence with the signal inputted by the signal input pin D of the latch IC3, that is, the signal output pin Q of the latch IC3 can output the low level signal to the intelligent power module 103, the intelligent power module 103 resumes the output of the phase current, so that the compressor 200 starts normally.

Figure 8:
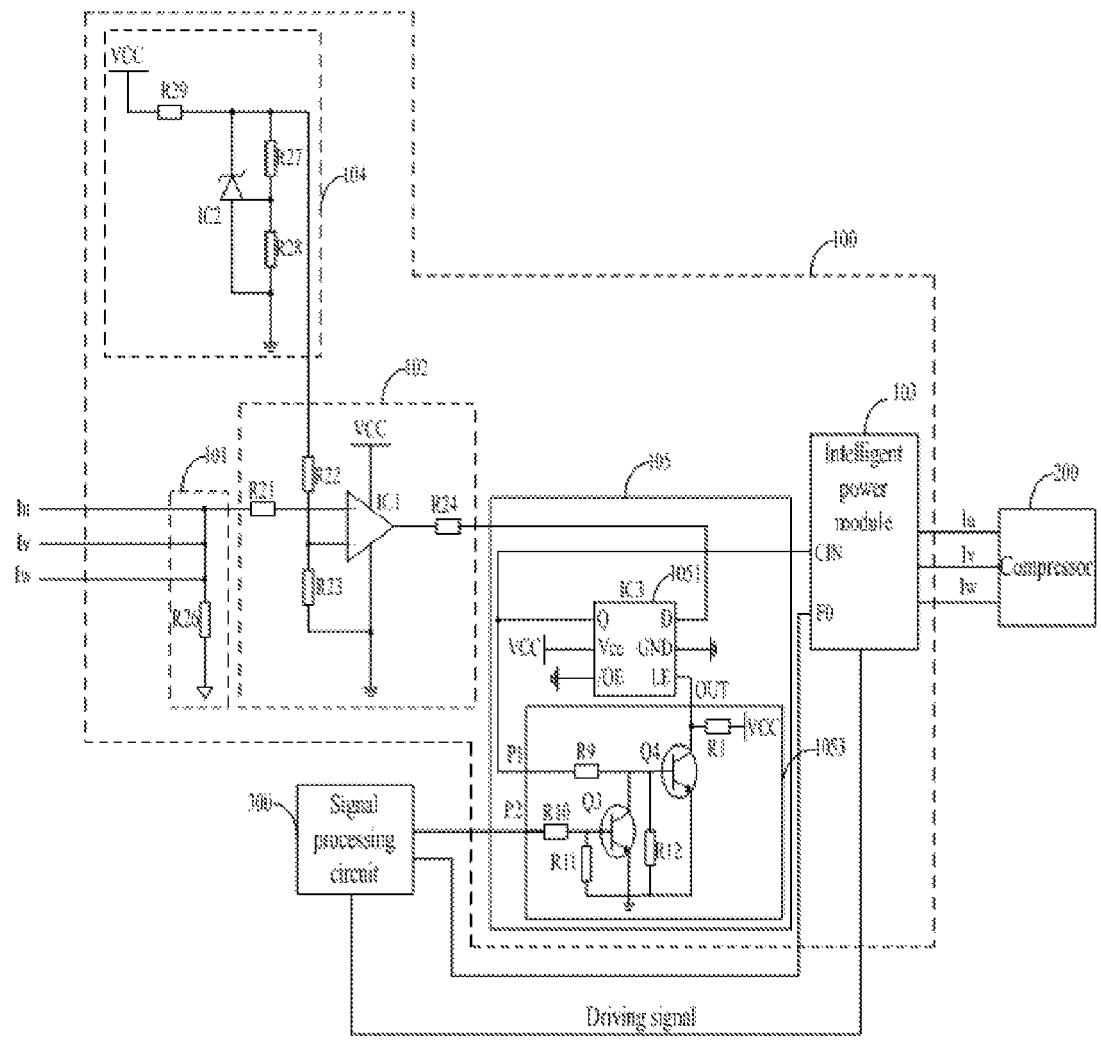
FIG. 8 is a circuit structure diagram of the compressor protection circuit shown in FIG. 2 according to a third exemplary embodiment.

FIG. 8 shows a circuit structure diagram of the compressor protection circuit shown in FIG. 2 according to a third exemplary embodiment. For illustrative purposes, FIG. 8 only shows parts related to the exemplary embodiment of the present disclosure. Among them, the structures of the current sampling module 101, the voltage comparison module 102, the intelligent power module 103, the reference voltage generating module 104 are all the same with the structures shown in FIG. 4, so no need to repeat herein. A difference among the first exemplary embodiment, the second exemplary embodiment and the third exemplary embodiment is that the circuit structure of the control circuit of the latching-controlling of the signal latching module 105. In the exemplary embodiment, the latching control circuit 1053 includes: a first resistor R1, a ninth resistor R9, a tenth resistor R10, an eleventh resistor R11, a twelfth resistor R12, a third transistor Q3, a fourth transistor Q4.

In detail, a first end of the tenth resistor R10 is connected with the signal processing circuit 300, a second end of the tenth resistor R10 and a first end of the eleventh resistor R11 are jointly connected with the a base of the third transistor Q3, a first end of the ninth resistor R9 is connected with the output pin D of the latch IC3, a second end of the ninth resistor R9, a collector of the third transistor Q3 and a first end of the twelfth resistor R12 are jointly connected with a base of the fourth transistor Q4, a second end of the eleventh resistor R11, an emitter of the third transistor Q3, a second end of the twelfth resistor R12 and an emitter of the fourth transistor Q4 are jointly grounded, a collector of the fourth transistor Q4 and a first end of the first resistor R1 are jointly connected with the signal control pin LE of the latch 1051, a second end of the first resistor R1 is connected with the direct current power VCC.

The compressor protection circuit shown in FIG. 8 can be further described combining with the operating principle:

When the phase current (that is, the phase current outputted by the intelligent power module 103) of the compressor 200 increases to make the voltage on the twenty-sixth resistor R26 higher than the voltage on in-phase input end of the first comparator IC1, at this time, the first comparator IC1 can output the high level signal (that is, the overcurrent level signal) to the signal input pin D of the latch IC3. According to the operation principle of the latch, at this time, the signal output pin Q of the latch IC3 can output the high level signal received by the signal input pin D to the testing port for protecting trigger voltage Cin of the intelligent power module 103, and the intelligent power module 103 can shut off the output of the phase current to control the compressor 200 to go down immediately. Meanwhile, the high level signal outputted by the signal output pin Q of the latch IC3 can also be inputted to the base of the NPN transistor Q1 through the second resistor R2. While when the signal processing circuit 300 does not output the latching cancel signal, the signal processing circuit 300 always outputs the low level signal, the low level signal can be transferred to the NPN transistor Q3 through the tenth resistor R10, and the NPN transistor Q3 ends, at this time the base of the transistor Q4 finally inputs the high level signal, that is, the NPN transistor Q1 is breakover, and the signal control pin LE of the latch IC3 changes to low level corresponding. According to the operating principle of the latch, the latching function of the latch IC3 beings to effect, no matter what would happen to the signal of the signal input pin D of the latch IC3, the signal outputted by the signal output pin Q of the latch IC3 remain unchanged by the latch IC3, that is, the signal output pin Q of the latch IC3 outputs the high level signal continuously, and the intelligent power module 103 shuts off the output of the phase current continuously to control the compressor 200 to go down. Meanwhile, the fault signal output pin F0 of the intelligent power module 103 can output a level pulse signal (that is the fault protection signal) to the signal processing circuit 300, the signal processing circuit 300 shuts off the output of the driving signal according to the level pulse signal. As the compressor 200 has already stopped working, the voltage on the twenty-sixth resistor R26 is zero, and the first comparator IC1 outputs the low level signal (that is the conventional level signal) to the signal input pin D of the latch IC3, while the latching function of the latch IC3 still works, so the signal output pin Q of the latch IC3 still outputs high level signal, and further makes the intelligent power module 103 to shut off the output of phase current to control the compressor 200 to go down. During the time, as the intelligent power module 103 is in the off state, so if the drive signal line between the signal processing circuit 300 and the intelligent power module 103 is affected by the strong interference signal, the intelligent power module 103 can be prevented from outputting the large current or being damaged, thereby achieving the purpose of effectively protecting the compressor 200. When the state of the control circuit of the air conditioner is stably or the fault is removed (such as, the voltage and the current of the input power are normal), the signal processing circuit 300 can output the high level signal (that is the latching cancel signal) to the latch IC3 after delaying the preset time (such as 30 seconds), the high level signal is inputted to the NPN transistor Q3 through the tenth resistor R10, so that the NPN transistor Q3 is breakover, at this time, the base of the NPN transistor Q4 is inputted the low level signal finally, at this time the NPN transistor Q4 ends, and the signal control pin LE of the latch IC3 can transfer to high level, the latching function of the latch IC3 is void. At this time according to the operation principle of the latch, the signal outputted by the signal output pin Q of the latch IC3 is consistence with the signal inputted by the signal input pin D of the latch IC3, that is, the signal output pin Q of the latch IC3 can output the low level signal to the intelligent power module 103, and the intelligent power module 103 resumes the output of the phase current, so that the compressor 200 starts normally.

Figure 9:
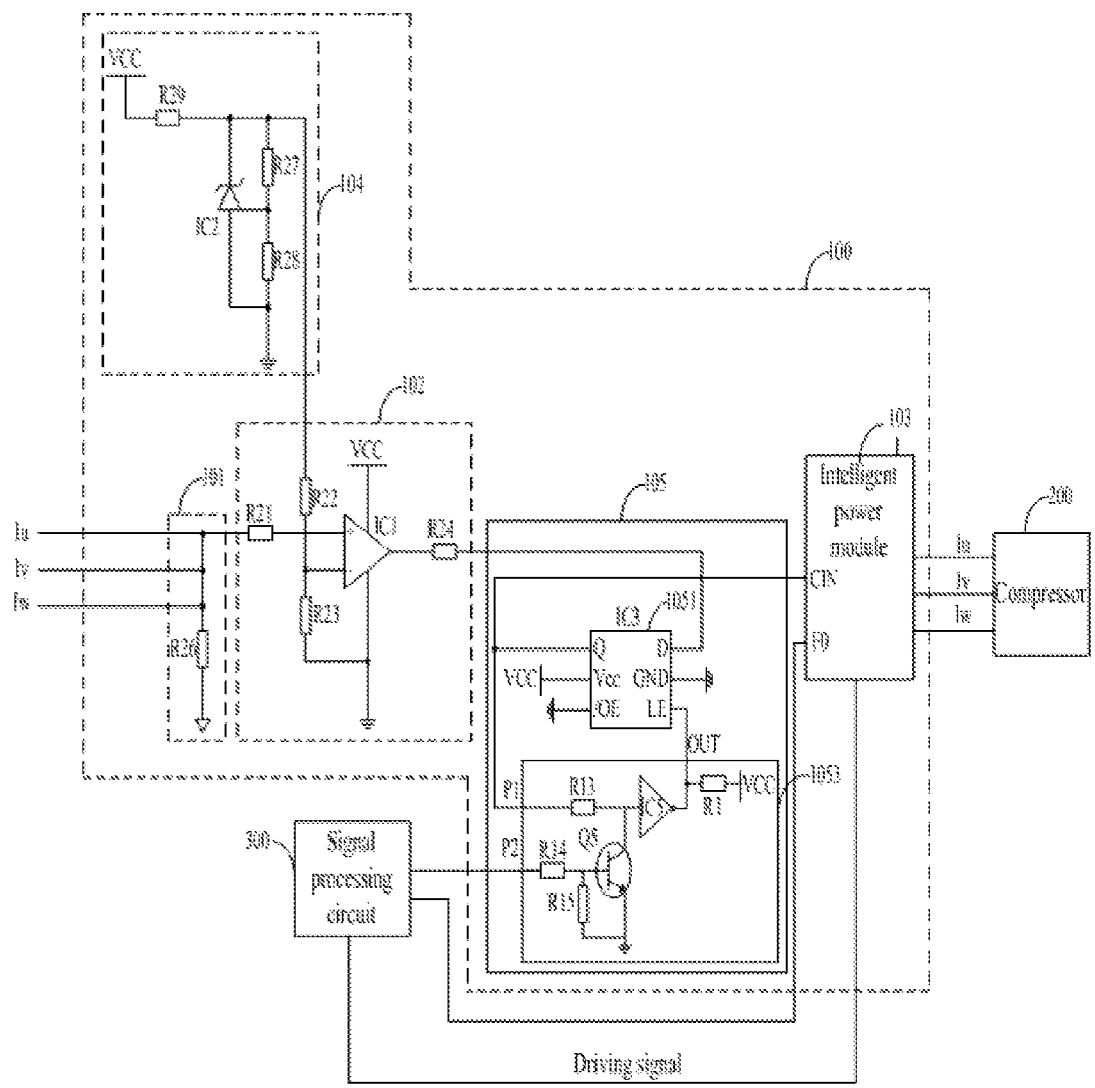
FIG. 9 is a circuit structure diagram of the compressor protection circuit shown in FIG. 2 according to a fourth exemplary embodiment.

FIG. 9 shows a sampled circuit structure diagram of the compressor protection circuit shown in FIG. 2 according to a fourth exemplary embodiment. For illustrative purposes, FIG. 9 only shows parts related to the exemplary embodiment of the present disclosure. Among them, the structures of the current sampling module 101, the voltage comparison module 102, the intelligent power module 103, the reference voltage generating module 104 are all the same with the structures shown in FIG. 4, so no need to repeat herein. A difference among the first exemplary embodiment, the second exemplary embodiment, the third exemplary embodiment and the fourth exemplary embodiment is that the circuit structure of the control circuit of the latching-controlling of the signal latching module 105. In the exemplary embodiment, the latching control circuit 1053 includes: a first resistor R1, a thirteenth resistor R13, a fourteenth resistor R14, a fifteenth resistor R15, a fifth transistor Q5, an inverter IC5.

In detail, a first end of the fourteenth resistor R14 is connected with the signal processing circuit 300, a second end of the fourteenth resistor R14 and a first end of the fifteenth resistor R15 are jointly connected with the a base of the fifth transistor Q5, a second end of the fifteenth resistor R15 and an emitter of the fifth transistor Q5 are jointly grounded, a first end of the thirteenth resistor R13 is connected with the signal output pin of the latch IC3, a second end of the thirteenth resistor R13 and a collector of the fifth transistor Q5 are jointly connected with an input end of the inverter IC5, an output end of the inverter IC5 and a first end of the first resistor R1 are jointly connected with the signal control pin LE of the latch 1051, a second end of the first resistor R1 is connected with the direct current power VCC.

The compressor protection circuit shown in FIG. 9 can be further described combining with the operating principle:

When the phase current (that is, the phase current outputted by the intelligent power module 103) of the compressor 200 increases to make the voltage on the twenty-sixth resistor R26 higher than the voltage on in-phase input end of the first comparator IC1, at this time, the first comparator IC1 can output the high level signal (that is, the overcurrent level signal) to the signal input pin D of the latch IC3. According to the operation principle of the latch, at this time, the signal output pin Q of the latch IC3 can output the high level signal received by the signal input pin D to the testing port for protecting trigger voltage Cin of the intelligent power module 103, and the intelligent power module 103 can shut off the output of the phase current to control the compressor 200 to go down immediately. Meanwhile, the high level signal outputted by the signal output pin Q of the latch IC3 can also be inputted to the input end of the inverter IC5 through the thirteenth resistor R13. While when the signal processing circuit does not output the latching cancel signal, the signal processing circuit 300 always outputs the low level signal, the low level signal can be transferred to the NPN transistor Q5 through the fourteenth resistor R14, and the NPN transistor Q5 ends, at this time, the input end of the inverter IC5 inputs the high level signal finally, so that the output end of the inverter IC5 outputs the low level signal, that is signal control pin LE of the latch IC3 changes to low level corresponding. According to the operating principle of the latch, the latching function of the latch IC3 begins to effect, no matter what would happen to the signal of the signal input pin D of the latch IC3, the signal outputted by the signal output pin Q of the latch IC3 remain unchanged by the latch IC3, that is, the signal output pin Q of the latch IC3 outputs the high level signal continuously, and the intelligent power module 103 shuts off the output of the phase current continuously to control the compressor 200 to go down. Meanwhile, the fault signal output pin F0 of the intelligent power module 103 can output a level pulse signal (that is the fault protection signal) to the signal processing circuit 300, the signal processing circuit 300 shuts off the output of the driving signal according to the level pulse signal. As the compressor 200 has already stopped working, the voltage on the twenty-sixth resistor R26 is zero, and the first comparator IC1 outputs the low level signal (that is the conventional level signal) to the signal input pin D of the latch IC3, while the latching function of the latch IC3 still works, so the signal output pin Q of the latch IC3 still outputs high level signal, and further makes the intelligent power module 103 to shut off the output of phase current to control the compressor 200 to go down. During the time, as the intelligent power module 103 is in the off state, so if the drive signal line between the signal processing circuit 300 and the intelligent power module 103 is affected by the strong interference signal, the intelligent power module 103 can be prevented from outputting the large current or being damaged, thereby achieving the purpose of effectively protecting the compressor 200. When the state of the control circuit of the air conditioner is stably or the fault is removed (such as, the voltage and the current of the input power are normal), the signal processing circuit 300 can output the high level signal (that is the latching cancel signal) to the latch IC3 after delaying the preset time (such as 30 seconds), the high level signal is inputted to the NPN transistor Q5 through the fourteenth resistor R14, so that the NPN transistor Q1 is breakover, and the signal control pin LE of the latch IC3 can transfer to high level, the latching function of the latch IC3 is void. At this time according to the operation principle of the latch, the signal outputted by the signal output pin Q of the latch IC3 is consistence with the signal inputted by the signal input pin D of the latch IC3, that is, the signal output pin Q of the latch IC3 can output the low level signal to the intelligent power module 103, the intelligent power module 103 resumes the output of the phase current, so that the compressor 200 starts normally.

Figure 10:
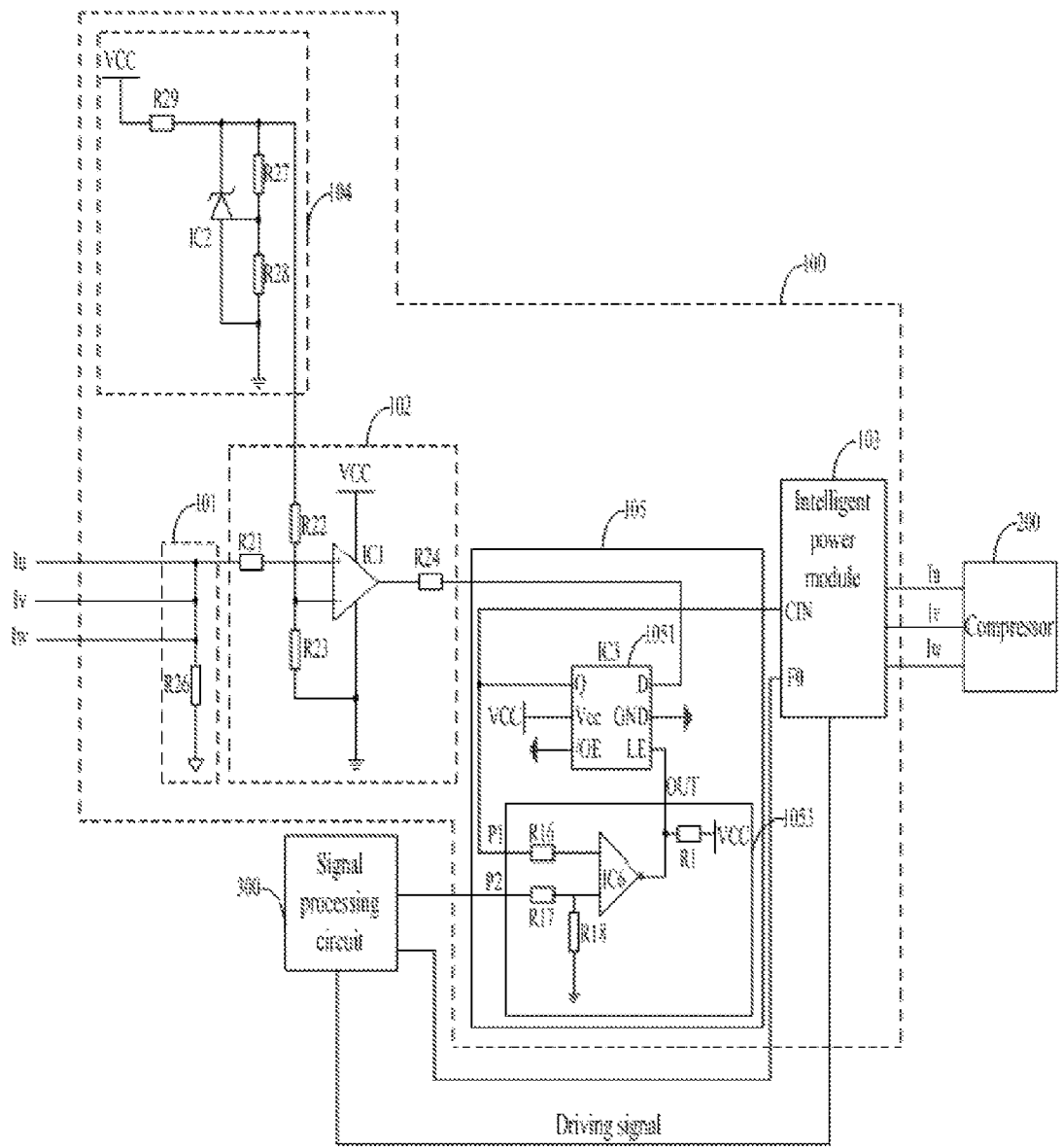
FIG. 10 is a circuit structure diagram of the compressor protection circuit shown in FIG. 2 according to a fifth exemplary embodiment.

FIG. 10 shows a circuit structure diagram of the compressor protection circuit shown in FIG. 2 according to a fifth exemplary embodiment. For illustrative purposes, FIG. 10 only shows parts related to the exemplary embodiment of the present disclosure. Among them, the structures of the current sampling module 101, the voltage comparison module 102, the intelligent power module 103, the reference voltage generating module 104 are all the same with the structures shown in FIG. 4, so no need to repeat herein. A difference among the first to the fourth exemplary embodiment the fifth exemplary embodiment is that the circuit structure of the control circuit of the latching-controlling of the signal latching module 105. In the exemplary embodiment, the latching control circuit 1053 includes: a first resistor R1, a sixteenth resistor R16, a seventeenth resistor R17, a eighteenth resistor R18, a nand gate IC6.

In detail, a first end of the sixteenth resistor R16 is connected with the signal output pin of the latch IC3, a second end of the sixteenth resistor R16 is connected with a first input end of the nand gate IC6, a first end of the seventeenth resistor R17 is connected with the signal processing circuit 300, a second end of the seventeenth resistor R17 and a first end of the eighteenth resistor R18 are jointly connected with the a second input end of the nand gate IC6, a second end of the eighteenth resistor R18 is grounded, an output end of the nand gate IC6 and a first end of the first resistor R1 are jointly connected with the signal control pin LE of the latch 1051, a second end of the first resistor R1 is connected with the direct current power VCC.

The compressor protection circuit shown in FIG. 10 can be further described combining with the operating principle:

When the phase current (that is, the phase current outputted by the intelligent power module 103) of the compressor 200 increases to make the voltage on the twenty-sixth resistor R26 higher than the voltage on the in-phase input end of the first comparator IC1, at this time, the first comparator IC1 can output the high level signal (that is, the overcurrent level signal) to the signal input pin D of the latch IC3. According to the operation principle of the latch, at this time, the signal output pin Q of the latch IC3 can output the high level signal received by the signal input pin D to the testing port for protecting trigger voltage Cin of the intelligent power module 103, and the intelligent power module 103 can shut off the output of the phase current to control the compressor 200 to go down immediately. Meanwhile, the high level signal outputted by the signal output pin Q of the latch IC3 can also be inputted to the first input end of the nand gate IC6 though the sixteenth resistor R16. While when the signal processing circuit 300 does not output the latching cancel signal, the signal processing signal circuit 300 always outputs the high level signal, the high level signal is transferred to the second input end of the nand gate IC6 through the seventeenth resistor R17, at this time the input end of the nand gate IC6 inputs the high level signal, so that the output end of the nand gate IC6 outputs the low level signal, that is, the signal control pin LE of the latch IC3 changes to low level corresponding. According to the operating principle of the latch, the latching function of the latch IC3 begins to effect, no matter what would happen to the signal of the signal input pin D of the latch IC3, the signal outputted by the signal output pin Q of the latch IC3 remain unchanged by the latch IC3, that is, the signal output pin Q of the latch IC3 outputs the high level signal continuously, and the intelligent power module 103 shuts off the output of the phase current continuously to control the compressor 200 to go down. Meanwhile, the fault signal output pin F0 of the intelligent power module 103 can output a level pulse signal (that is the fault protection signal) to the signal processing circuit 300, the signal processing circuit 300 shuts off the output of the driving signal according to the level pulse signal. As the compressor 200 has already stopped working, the voltage on the twenty-sixth resistor R26 is zero, and the first comparator IC1 outputs the low level signal (that is the conventional level signal) to the signal input pin D of the latch IC3, while the latching function of the latch IC3 still works, so the signal output pin Q of the latch IC3 still outputs high level signal, and further makes the intelligent power module 103 to shut off the output of phase current to control the compressor 200 to go down. During the time, as the intelligent power module 103 is in the off state, so if the drive signal line between the signal processing circuit 300 and the intelligent power module 103 is affected by the strong interference signal, the intelligent power module 103 can be prevented from outputting the large current or being damaged, thereby achieving the purpose of effectively protecting the compressor 200. When the state of the control circuit of the air conditioner is stably or the fault is removed (such as, the voltage and the current of the input power are normal), the signal processing circuit 300 can output the low level signal (that is the latching cancel signal) to the latch IC3 after delaying a preset time (such as 30 seconds), the low level signal is inputted to the second input end of the nand gate IC6 through the seventeenth resistor R17, at this time the output end of the nand gate IC6 outputs the high level, the signal control pin LE of the latch IC3 transfers to high level, the latching function of the latch IC3 is void. At this time according to the operation principle of the latch, the signal outputted by the signal output pin Q of the latch IC3 is consistence with the signal inputted by the signal input pin D of the latch IC3, that is, the signal output pin Q of the latch IC3 can output the low level signal to the intelligent power module 103, the intelligent power module 103 resumes the output of the phase current, so that the compressor 200 starts normally.

Figure 11:
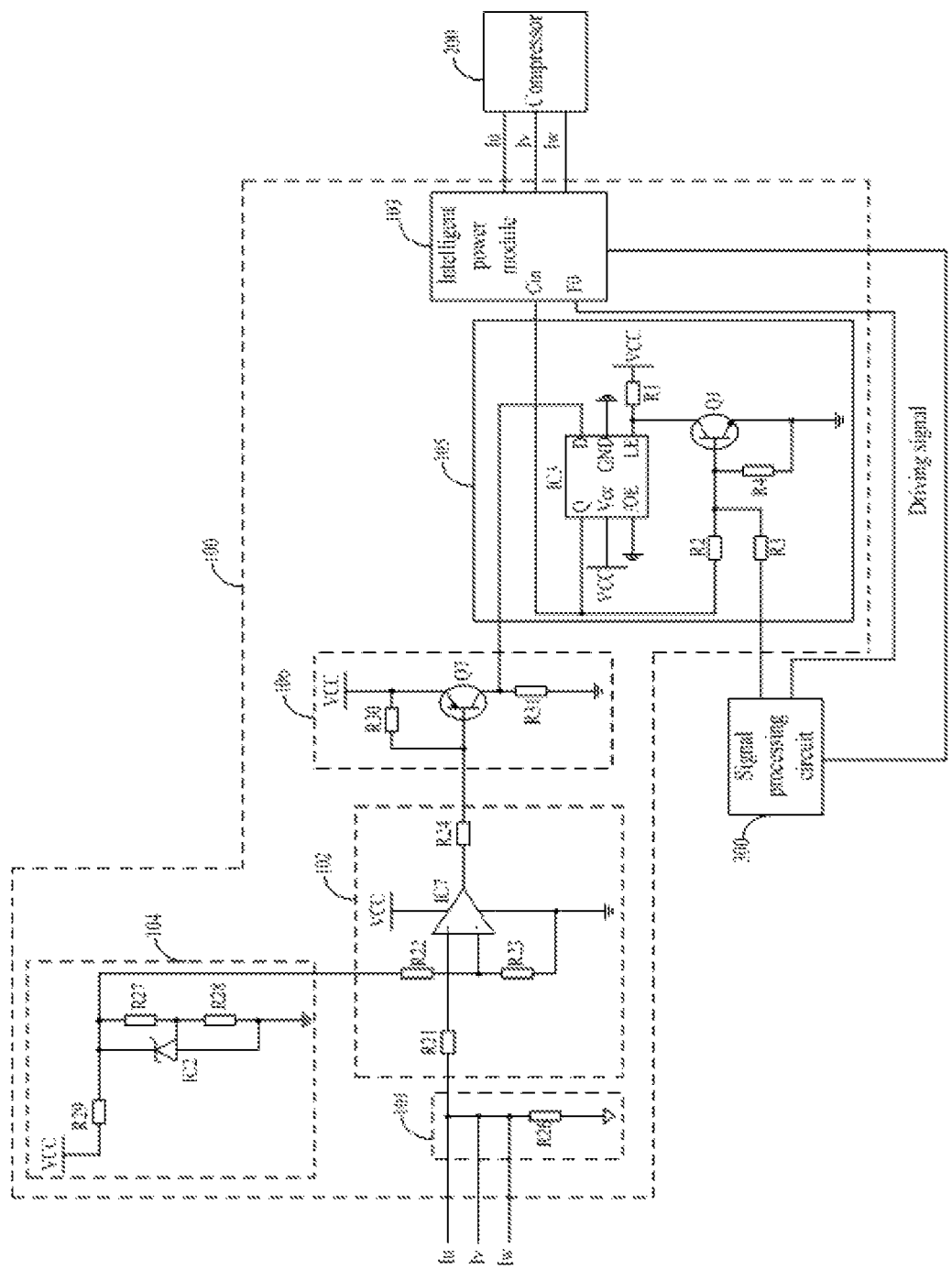
FIG. 11 is a sampled circuit structure diagram of the compressor protection circuit shown in FIG. 3.

FIG. 11 shows a sampled circuit structure diagram of the compressor protection circuit shown in FIG. 3, and the structures of the current sampling module 101, the intelligent power module 103, the reference voltage generating module 104 are all the same with the structures shown in FIG. 5, so no need to repeat herein. The structure of the signal latching module 105 is the same with the structure of the signal latching module 105 shown in any one of the FIGS. 5-10, so no need to repeat herein.

For the voltage comparison module 102, which includes:
a twenty-first resistor R21, a twenty-second resistor R22, a twenty-third resistor R23, a second comparator IC7 and a twenty-fourth resistor R24;

A first end of the twenty-first resistor R21 and a first end of the twenty-second resistor R22 can be the first input end and the second input end of the voltage comparison module 102 respectively, a second end of the twenty-first resistor R21 is connected with the anti-phase input end of the second comparator IC7, a second end of the twenty-second resistor R22 and a first end of the twenty-third resistor R23 are jointly connected with the in-phase input end of the second comparator IC7, the positive power end of the second comparator IC7 is connected with the direct current power VCC, the negative power end of the second comparator IC7 and a second end of the twenty-third resistor R23 are jointly grounded, the output end of the second comparator IC7 is connected with a first end of the twenty-fourth resistor R24, a second end of the twenty-fourth resistor R24 can be defined as the output end of the voltage comparison module 102.

For the first signal shaping module 106, which includes: a thirtieth resistor R30, a seventh transistor Q7, and a thirty-first resistor R31, in the exemplary embodiment, the seventh transistor Q7 can be a PNP transistor.

A joint point of a first end of the thirtieth resistor R30 and a base of the PNP transistor Q7 can be the input end of the first signal shaping module 106, a second end of the thirtieth resistor R30 and an emitter of the PNP transistor Q7 are jointly connected with the direct current power VCC, a joint point of a collector of the PNP transistor Q7 and a first end of the thirty-first resistor R31 is the output end of the first signal shaping module 106, a second end of the thirty-first resistor R31 is grounded.

The compressor protection circuit shown in FIG. 11 can be further described combining with the operating principle:

When the phase current (that is, the phase current outputted by the intelligent power module 103) of the compressor 200 increases to make the voltage on the twenty-sixth resistor R26 higher than voltage of in-phase input end of the second comparator IC7, at this time, the first second IC7 can output the high level signal (that is, the overcurrent level signal) which can be amplified, separated and reversed by a signal shaping circuit formed by the thirtieth resistor R30, the seventh transistor Q7, and the thirty-first resistor R31 (that is the shaped overcurrent level signal), the shaped high level signal can be outputted to the signal input pin D of the latch IC3, according to the operation principle of the latch, at this time, the signal output pin Q of the latch IC3 can output the high level signal received by the signal input pin D to the testing port for protecting trigger voltage Cin of the intelligent power module 103, and the intelligent power module 103 can shut off the output of the phase current to control the compressor 200 to go down immediately. Meanwhile, the high level signal outputted by the signal output pin Q of the latch IC3 can also be inputted to the base of the NPN transistor Q1 through the second resistor R2, so that the NPN transistor Q1 is breakover, and the signal control pin LE of the latch IC3 changes to low level corresponding, according to the operating principle of the latch, the latching function of the latch IC3 begins to effect, no matter what would happen to the signal of the signal input pin D of the latch IC3, the signal outputted by the signal output pin Q of the latch IC3 remain unchanged by the latch IC3, that is, the signal output pin Q of the latch IC3 outputs the high level signal continuously, and the intelligent power module 103 shuts off the output of the phase current continuously to control the compressor 200 to go down. Meanwhile, the fault signal output pin F0 of the intelligent power module 103 can output a level pulse signal (that is the fault protection signal) to the signal processing circuit 300, the signal processing circuit 300 shuts off the output of the driving signal according to the level pulse signal. As the compressor 200 stops working, the voltage on the twenty-sixth resistor R26 is zero, the high level signal outputted by the second comparator IC4 can be amplified, separated and reversed by the signal shaping circuit formed by the thirtieth resistor R30, the seventh transistor Q7, and the thirty-first resistor R31 (that is the shaped overcurrent level signal) to output the low level signal (that is the shaped conventional level signal), the shaped low level signal can be outputted to the signal input pin D of the latch IC3, while the latching function of the latch IC3 still works, so the signal output pin Q of the latch IC3 still outputs high level signal, and further makes the intelligent power module 103 to shut off the output of phase current to control the compressor 200 to go down. During the time, as the intelligent power module 103 is in the off state, so if the drive signal line between the signal processing circuit 300 and the intelligent power module 103 is affected by the strong interference signal, the intelligent power module 103 can be prevented from outputting the large current or being damaged, thereby achieving the purpose of effectively protecting the compressor 200. When the state of the control circuit of the air conditioner is stably or the fault is removed (such as, the voltage and the current of the input power are normal), the signal processing circuit 300 can output the low level signal (that is the latching cancel signal) to the latch IC3 after delaying a preset time (such as 30 seconds), the low level signal is inputted to the NPN transistor Q1 through the third resistor R3, so that the NPN transistor Q1 ends, and the signal control pin LE of the latch IC3 can transfer to high level, the latching function of the latch IC3 is void. At this time according to the operation principle of the latch, the signal outputted by the signal output pin Q of the latch IC3 is consistence with the signal inputted by the signal input pin D of the latch IC3, that is, the signal output pin Q of the latch IC3 can output the low level signal to the intelligent power module 103, the intelligent power module 103 resumes the output of the phase current, so that the compressor 200 starts normally.

Figure 12:
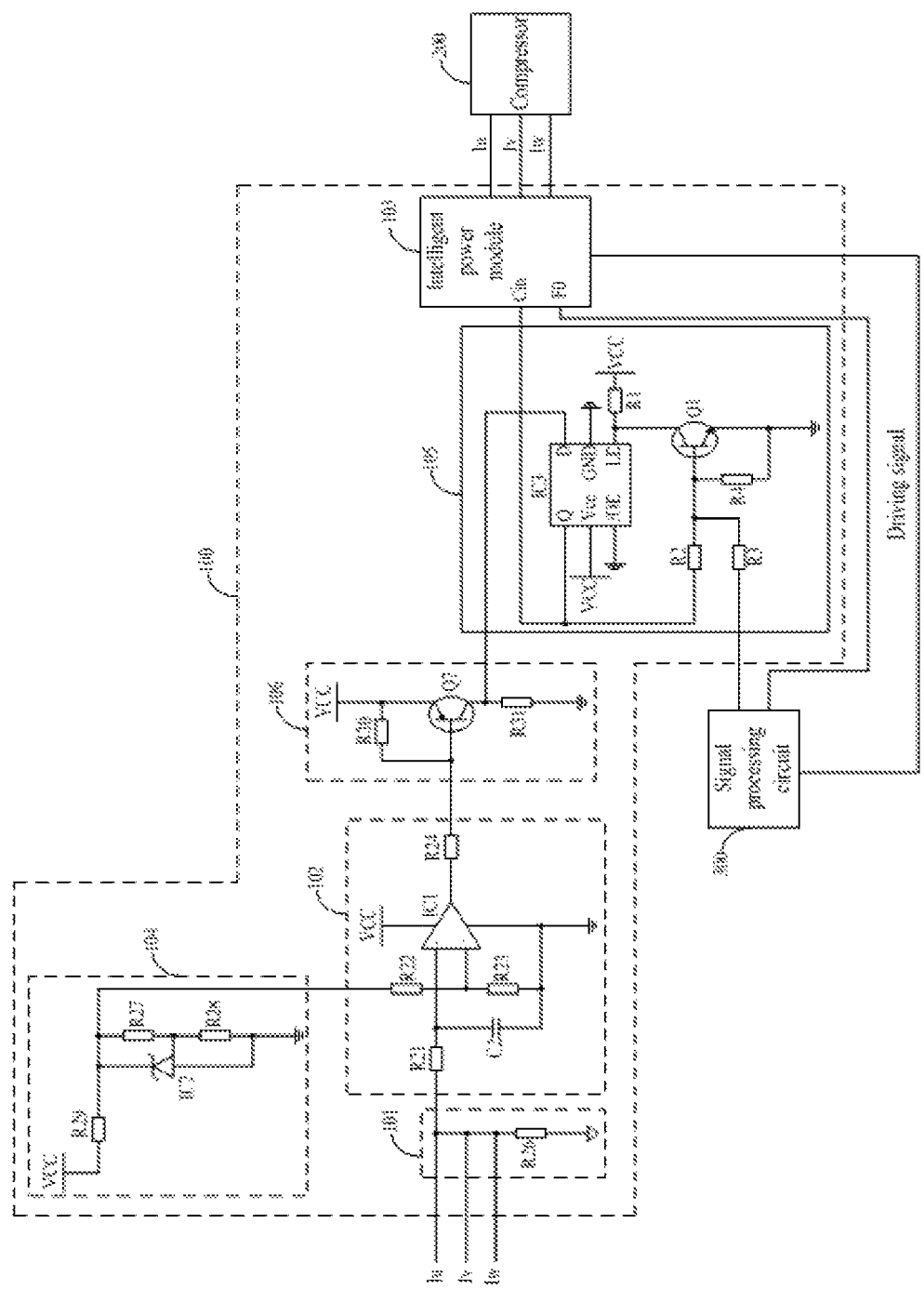
FIG. 12 is another sampled circuit structure diagram of the compressor protection circuit shown in FIG. 3.

In addition, as shown in FIG. 12, the voltage comparison module 102 further includes a second capacitor C2, the second capacitor C2 is connected between an anti-phase input end of the second comparator IC7 and the ground, the second capacitor C2 can be used for filtering the input signal of the anti-phase input end of the second comparator IC7.

In conclusion, the another exemplary embodiment of the present disclosure adopts the signal latching module 105 and the first signal shaping module 106 in the compressor protection circuit having the current sampling module 101, the reference voltage generating module 104, the voltage comparison module 102 and the intelligent power module 103, when the phase current compressor 200 occurs overcurrent, the voltage comparison module 102 outputs the overcurrent level signal shaped by the first signal shaping module 106 to the signal latching module 105, the signal latching module 105 latches and outputs the overcurrent level signal and then output the overcurrent level signal to the intelligent power module 103, the intelligent power module 103 shuts off the output of the overcurrent according to the shaped overcurrent level signal, so as to achieve the overcurrent protection of the compressor 200, then the voltage comparison module 102 outputs the conventional level signal shaped by the first signal shaping module 106 to the signal latching module 105, while the signal latching module 105 still keeps outputting the shaped overcurrent level signal, the signal latching module 105 outputs the shaped conventional level signal until the latching cancel signal output by a signal processing circuit 300 is received, so that the intelligent power module 103 starts to output the phase current, thereby enabling the compressor 200 to normally operate. In this way, when the strong interference signal exists on the drive signal line between the signal processing circuit 300 and the intelligent power module 103, the intelligent power module 103 can be prevented from outputting the large current or being damaged, thereby achieving the purpose of effectively protecting the compressor 200.

Figure 13:
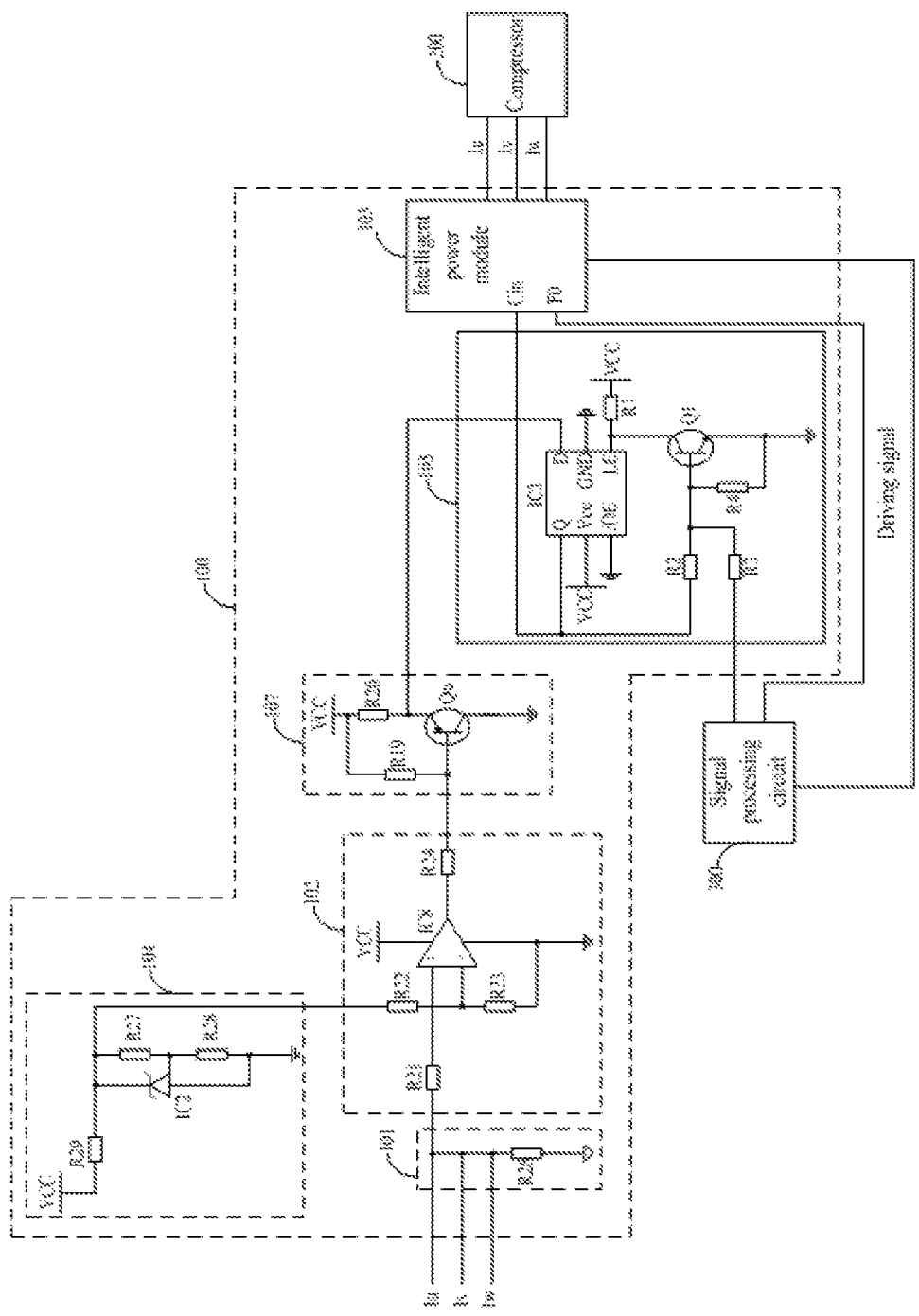
FIG. 13 is a sampled circuit structure diagram of the compressor protection circuit shown in FIG. 4.

FIG. 13 shows a sampled circuit structure diagram of the compressor protection circuit shown in FIG. 4, and, the structures of the current sampling module 101, the voltage comparison module 102, the intelligent power module 103, the reference voltage generating module 104 are all the same with the structures shown in FIG. 4, so no need to repeat herein. The structure of the signal latching module 105 is the same with the structure of the signal latching module 105 shown in any one of the FIGS. 5-10, so no need to repeat herein. The structure of the signal latching module 105 shown in FIG. 13 is the same with the structure of the signal latching module 105 shown in FIG. 8.

For the second signal shaping module 107, which includes: a nineteenth resistor R19, a twentieth resistor R20 and a sixth transistor Q6, in the exemplary embodiment, the sixth transistor Q6 can be a PNP transistor.

A joint point of a first end of the nineteenth resistor R19 and a base of the PNP transistor Q6 can be the input end of the second signal shaping module 107, a second end of the nineteenth resistor R19 and a first end of the twentieth resistor R20 are jointly connected with the direct current power VCC, a joint point of a second end of the twentieth resistor R20 and an emitter of the PNP transistor Q6 is the output end of the second signal shaping module 107, a collector of the PNP transistor Q6 is grounded.

The compressor protection circuit shown in FIG. 13 can be further described combining with the operating principle:

At the initial time of powering the processor protection circuit 100, as three comparator IC8 need a short time to output the effective overcurrent level signal or the conventional level signal, so that, at this time the PNP transistor Q6 ends, the emitter of the PNP transistor Q6 can output the high level signal (that is the overcurrent level signal) to the signal latching module 105, and control the intelligent power module 103 to shut off the output of the phase current through the intelligent power module 105, so if the drive signal line between the signal processing circuit 300 and the intelligent power module 103 is affected by the strong interference signal, the intelligent power module 103 can be prevented from outputting the large current or being damaged, thereby achieving the purpose of effectively protecting the compressor 200. After the processor protection circuit is powered, the voltage comparison module 102 can output the high level signal or the low level signal (that is the conventional level signal) according to the comparison result of the sampling voltage and the reference voltage;

When the phase current (that is, the phase current outputted by the intelligent power module 103) of the compressor 200 increases to make the voltage on the twenty-sixth resistor R26 higher than the voltage of anti-phase input end of the first comparator IC1, at this time, the first comparator IC1 can output the low level signal which can be amplified and separated by a signal shaping circuit formed by the nineteenth resistor R19, the NPN transistor Q6, and the twentieth resistor R20, the shaped low level signal can be outputted to the signal input pin D of the latch IC3, according to the operation principle of the latch, according to the operation principle of the latch, at this time, the signal output pin Q of the latch IC3 can output the high level signal received by the signal input pin D to the testing port for protecting trigger voltage Cin of the intelligent power module 103, and the intelligent power module 103 can shut off the output of the phase current to control the compressor 200 to go down immediately. Meanwhile, the high level signal outputted by the signal output pin Q of the latch IC3 can also be inputted to the base of the NPN transistor Q1 through the second resistor R2, so that the NPN transistor Q1 is break-over, and the signal control pin LE of the latch IC3 changes to low level corresponding, according to the operating principle of the latch, the latching function of the latch IC3 begins to effect, no matter what would happen to the signal of the signal input pin D of the latch IC3, the signal outputted by the signal output pin Q of the latch IC3 remain unchanged by the latch IC3, that is, the signal output pin Q of the latch IC3 outputs the high level signal continuously, and the intelligent power module 103 shuts off the output of the phase current continuously to control the compressor 200 to go down. Meanwhile, the fault signal output pin F0 of the intelligent power module 103 can output a level pulse signal (that is the fault protection signal) to the signal processing circuit 300, the signal processing circuit 300 shuts off the output of the driving signal according to the level pulse signal. As the compressor 200 stops working, the voltage on the twenty-sixth resistor R26 is zero, and the third comparator IC8 outputs the low level signal which can be amplified and separated by a signal shaping circuit formed by the nineteenth resistor R19, the NPN transistor Q6, and the twentieth resistor R20, the shaped low level signal can be outputted to the signal input pin D of the latch IC3, while the latching function of the latch IC3 still works, so the signal output pin Q of the latch IC3 still outputs high level signal, and further makes the intelligent power module 103 to shut off the output of phase current to control the compressor 200 to go down. During the time, as the intelligent power module 103 is in the off state, so if the drive signal line between the signal processing circuit 300 and the intelligent power module 103 is affected by the strong interference signal, the intelligent power module 103 can be prevented from outputting the large current or being damaged, thereby achieving the purpose of effectively protecting the compressor 200. When the state of the control circuit of the air conditioner is stably or the fault is removed (such as, the voltage and the current of the input power are normal), the signal processing circuit 300 can output the low level signal (that is the latching cancel signal) to the latch IC3 after delaying a preset time (such as 30 seconds), the low level signal is inputted to the NPN transistor Q1 through the third resistor R3, so that the NPN transistor Q1 ends, and the signal control pin LE of the latch IC3 can transfer to high level, the latching function of the latch IC3 is void, at this time according to the operation principle of the latch, the signal outputted by the signal output pin Q of the latch IC3 is consistence with the signal inputted by the signal input pin D of the latch IC3, that is, the signal output pin Q of the latch IC3 can output the low level signal to the intelligent power module 103, the intelligent power module 103 resumes the output of the phase current, so that the compressor 200 starts normally.

Figure 14:
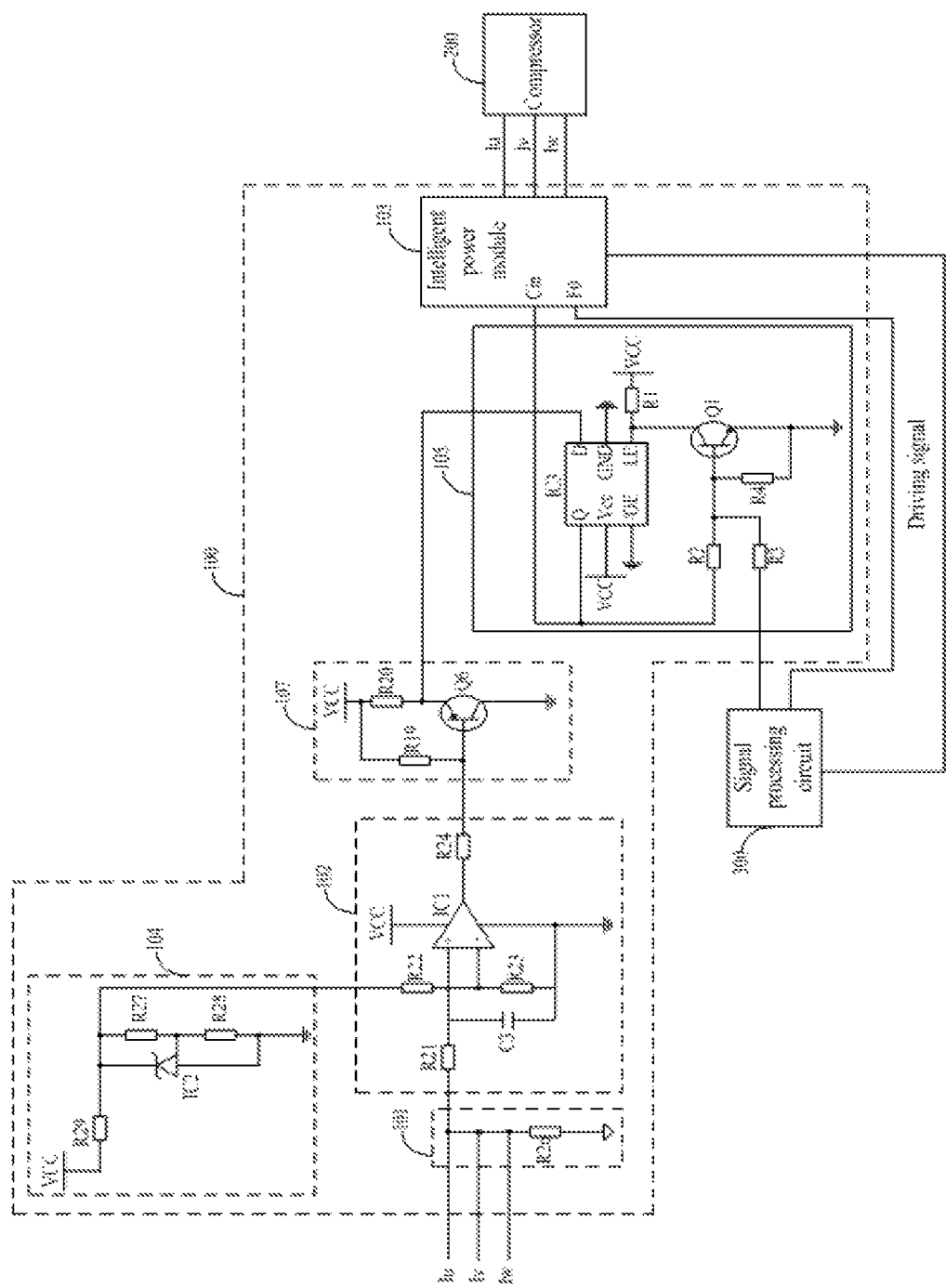
FIG. 14 is another sampled circuit structure diagram of the compressor protection circuit shown in FIG. 4.

In addition, referring to FIG. 14, the voltage comparison module 102 further includes a third capacitor C3, the third capacitor C3 is connected between the third comparator IC8 and the ground, the third capacitor C3 can be used for filtering the input signal of the in-phase input end of the third comparator IC8.

In conclusion, the another exemplary embodiment of the present disclosure adopts the signal latching module 105 and the second signal shaping module 107 in the compressor protection circuit having the current sampling module 101, the reference voltage generating module 104, the voltage comparison module 102 and the intelligent power module 103, at the initial time of powering the processor protection circuit 100, the second signal shaping module 107 can output the overcurrent level signal and control the intelligent power module 103 to shut off the output of the phase current through the signal latching module 105, so that the intelligent power module 103 can be prevented from outputting the large current or being damaged when the strong interference signal exists on the drive signal line between the signal processing circuit 300 and the intelligent power module 103 during powering, thereby achieving the purpose of effectively protecting the compressor 200.

After the processor protection circuit is powered, the voltage comparison module 102 can output the high level signal or the low level signal (that is the conventional level signal) according to the comparison result of the sampling voltage and the reference voltage, when the phase current compressor 200 occurs overcurrent, the overcurrent level signal outputted by the voltage comparison module 102 can be shaped by the second signal shaping module 107 and then outputted to the signal latching module 105, the signal latching module 105 latches the shaped overcurrent level signal and outputs to the intelligent power module 103, the intelligent power module 103 shuts off the output of the phase current according to the shaped overcurrent level signal, so as to achieve the overcurrent protection of the compressor 200. Then the conventional level signal outputted by the voltage comparison module 102 can be shaped by the second signal shaping module 107, and then outputted to the signal latching module 105, while the signal latching module 105 still outputs the shaped overcurrent level signal, until the latching cancel signal outputted by the signal processing circuit 300 is received, the signal latching module 105 outputs the shaped conventional level signal, so that the intelligent power module 103 starts to output the phase current, thereby enabling the compressor 200 to normally operate, in this way, when the strong interference signal exists on the drive signal line between the signal processing circuit 300 and the intelligent power module 103, the intelligent power module 103 can be prevented from outputting the large current or being damaged, thereby achieving the purpose of effectively protecting the compressor 200.

The embodiments above are preferably embodiments of the present disclosure, and the present disclosure is not limited to such embodiments, equivalent structure conversion based on the specification and the drawing of the present disclosure, or directly or indirectly used in other related technical field, both similarly within the protection scope of the present disclosure.

What is claimed is:

1. A compressor protection circuit, comprising: a current sampling module, a reference voltage generating module, a voltage comparison module, and an intelligent power module, the current sampling module sampling a phase current of the compressor and outputting a corresponding sampling voltage signal to a first input end of the voltage comparison module, the reference voltage generating module outputting a reference voltage signal to a second input end of the voltage comparison module, the voltage comparison module comparing the sampling voltage signal with the reference voltage signal; the intelligent power module controlling a working condition of the compressor according to a driving signal outputted by a signal processing circuit, when the intelligent power module shutting off the output, the intelligent power module outputting a fault protecting signal simultaneously, so that the signal processing circuit stopping outputting the driving signal; the compressor protection circuit further comprising a signal latching module;

an output end of the voltage comparison module being connected with an input end of the signal latching module, an output end of the signal latching module being connected with a testing port for protecting trigger voltage of the intelligent power module, a latching-controlling end of the signal latching module being connected with the signal processing circuit; when the sampling voltage signal being higher than the reference voltage signal, the voltage comparison module outputting an overcurrent level signal to the signal latching module, the signal latching module latching and outputting the overcurrent level signal to the intelligent power module continuously according to the overcurrent level signal, so that the intelligent power module shutting off the output of a phase current; when the signal processing circuit outputting a latching cancel signal to the signal latching module, the signal latching module outputting a conventional level signal to the intelligent power module according to the latching cancel signal, the intelligent power module driving the compressor to operate according to the conventional level signal and a driving signal outputted by the signal processing circuit.

2. The compressor protection circuit according to claim 1, wherein the signal latching module comprises a latch, a latching-controlling circuit, the latch comprises a signal input pin, a signal output pin and a signal control pin, the signal input pin of the latch is defined as the input end of the signal latching module, the signal output pin is defined as the output end of the signal latching module; the latching-controlling circuit comprises a first input end, a second input end and an output end, and the first input end of the latching-controlling circuit is connected with the signal input pin of the signal latching module, the second input end of the latching-controlling circuit is defined as the latching-controlling end of the signal latching module, the output end of the latching-controlling circuit is connected with signal control pin of the latch.

3. The compressor protection circuit according to claim 2, wherein the latching controlling circuit comprises:
a first resistor R1, a second resistor R2, a third resistor R3, a fourth resistor R4, a first transistor Q1;
a first end of the second resistor R2 is connected with the signal output pin of the latch, a first end of the third resistor R3 is connected with the signal processing circuit, a second end of the second resistor R2 and a second end of the third resistor R3 and a first end of the fourth resistor R4 are jointly connected with a base of the first transistor Q1, a second end of the fourth resistor R4 and an emitter of the first transistor Q1 are jointly grounded, a collector of the first transistor Q1 and a first end of the first resistor R1 are jointly connected with the signal control pin of the latch, a second end of the first resistor R1 is connected with a direct current power.

4. The compressor protection circuit according to claim 2, wherein the latching control circuit comprises:
a nand gate, a second transistor Q2, a first resistor R1, a fifth resistor R5, a sixth resistor R6, a seventh resistor R7, a eighth resistor R8;
a first end of the fifth resistor R5 is connected with the signal output pin of the latch, a second end of the fifth resistor R5 is connected with a first input end of the nand gate; a first end of the sixth resistor R6 is connected with the signal processing circuit, a second end of the sixth resistor R6 and a first end of the seventh resistor R7 are jointly connected with a base of the second transistor Q2, a second end of the seventh resistor R7 and an emitter of the second transistor Q2 are jointly grounded, a collector of the second transistor Q2 and a first end of the resistor R8 are jointly connected with a second input end of the nand gate, a second end of the resistor R8 is connected with a direct current power; an output end of the nand gate and a first end of the resistor R1 are jointly connected with the signal control pin of the latch, a second end of the resistor R1 is connected with the direct current power.

5. The compressor protection circuit according to claim 2, wherein the latching control circuit comprises:
a first resistor R1, a ninth resistor R9, a tenth resistor R10, an eleventh resistor R11, a twelfth resistor R12, a third transistor Q3, a fourth transistor Q4; a first end of the tenth resistor R10 is connected with the signal processing circuit, a second end of the tenth resistor R10 and a first end of the eleventh resistor R11 are jointly connected with the a base of the third transistor Q3, a first end of the ninth resistor R9 is connected with the output pin of the latch, a second end of the ninth resistor R9, a collector of the third transistor Q3 and a first end of the twelfth resistor R12 are jointly connected with a base of the fourth transistor Q4, a second end of the eleventh resistor R11, an emitter of the third transistor Q3, a second end of the twelfth resistor R12 and an emitter of the fourth transistor Q4 are jointly grounded, a collector of the fourth transistor Q4 and a first end of the first resistor R1 are jointly connected with the signal control pin of the latch, a second end of the first resistor R1 is connected with a direct current power.

6. The compressor protection circuit according to claim 2, wherein the latching control circuit comprises:
a first resistor R1, a thirteenth resistor R13, a fourteenth resistor R14, a fifteenth resistor R15, a fifth transistor Q5, an inverter;
a first end of the fourteenth resistor R14 is connected with the signal processing circuit, a second end of the fourteenth resistor R14 and a first end of the fifteenth resistor R15 are jointly connected with the a base of the fifth transistor Q5, a second end of the fifteenth resistor R15 and an emitter of the fifth transistor Q5 are jointly grounded, a first end of the thirteenth resistor R13 is connected with the signal output pin of the latch, a second end of the thirteenth resistor R13 and a collector of the fifth transistor Q5 are jointly connected with an input end of the inverter, an output end of the inverter and a first end of the first resistor R1 are jointly connected with the signal control pin of the latch, a second end of the first resistor R1 is connected with a direct current power.

7. The compressor protection circuit according to claim 2, wherein the latching control circuit comprises:
a first resistor R1, a sixteenth resistor R16, a seventeenth resistor R17, a eighteenth resistor R18, a nand gate;
a first end of the sixteenth resistor R16 is connected with the signal output pin of the latch, a second end of the sixteenth resistor R16 is connected with a first input end of the nand gate, a first end of the seventeenth resistor R17 is connected with the signal processing circuit, a second end of the seventeenth resistor R17 and a first end of the eighteenth resistor R18 are jointly connected with the a second input end of the nand gate, a second end of the eighteenth resistor R18 is grounded, an output end of the nand gate and a first end of the first resistor R1 are jointly connected with the signal control pin of the latch, a second end of the first resistor R1 is connected with a direct current power.

8. The compressor protection circuit according to claim 1, wherein the compressor protection circuit further comprises a signal shaping module, an input end and an output end of the signal shaping module are connected with the output end of the voltage comparison module and the input end of the signal latching module respectively, at an initial time of powering the processor protection circuit, the signal shaping module outputs the overcurrent level signal by itself and controls the intelligent power module to shut off the output of the phase current through the signal latching module, and after the voltage comparison module outputs the overcurrent level signal or the conventional level signal, the signal shaping module shapes the overcurrent level signal or the conventional level signal outputted by the voltage comparison module and then outputs the shaped overcurrent level signal or the shaped conventional level signal to the signal latching module.

9. The compressor protection circuit according to claim 8, wherein the signal shaping module comprises:
a nineteenth resistor R19, a twentieth resistor R20 and a sixth transistor Q6;
a joint point of a first end of the nineteenth resistor R19 and a base of a second PNP transistor Q6 is defined as an input end of a second signal shaping module, a second end of the nineteenth resistor R19 and a first end of the twentieth resistor R20 are jointly connected with a direct current power, a joint point of a second end of the twentieth resistor R20 and an emitter of the PNP transistor Q6 is defined as an output end of the second signal shaping module, a collector of the sixth transistor Q6 is grounded.

10. The compressor protection circuit according to claim 8, wherein the voltage comparison module comprises:
- a twenty-first resistor R21, a twenty-second resistor R22, a twenty-third resistor R23, a first comparator1, a twenty-fourth resistor R24;
- a first end of the twenty-first resistor R21 and a first end of the twenty-second resistor R22 are defined as the first input end and the second input end of the voltage comparison module respectively, a second end of the twenty-first resistor R21 is connected with an in-phase input end of the first comparator, a second end of the twenty-second resistor R22 and a first end of the twenty-third resistor R23 are jointly connected with an anti-phase input end of the first comparator, a positive power end of the first comparator is connected with a direct current power, a negative power end of the first comparator and a second end of the twenty-third resistor R23 are jointly grounded, an output end of the first comparator is connected with a first end of the twenty-fourth resistor R24, a second end of the twenty-fourth resistor R24 is the output end of the voltage comparison module.

11. An air conditioner, comprising a signal processing circuit and a compressor, the air conditioner further comprising a compressor protection circuit, and the compressor protection circuit comprising a current sampling module, a reference voltage generating module, a voltage comparison module, an intelligent power module, a signal latching module;
- the current sampling module sampling a phase current of the compressor and outputting a corresponding sampling voltage signal to a first input end of the voltage comparison module, the reference voltage generating module outputting a reference voltage signal to a second input end of the voltage comparison module, the voltage comparison module comparing the sampling voltage signal with the reference voltage signal;
- the intelligent power module controlling a working condition of the compressor according to a driving signal outputted by a signal processing circuit, when the intelligent power module shutting off the output, the intelligent power module outputting a fault protecting signal simultaneously, so that the signal processing circuit stopping outputting the driving signal;
- an output end of the voltage comparison module being connected with an input end of the signal latching module, an output end of the signal latching module being connected with a testing port for protecting trigger voltage of the intelligent power module, a latching-controlling end of the signal latching module being connected with the signal processing circuit; when the sampling voltage signal being higher than the reference voltage signal, the voltage comparison module outputting an overcurrent level signal to the signal latching module, the signal latching module latching and outputting the overcurrent level signal to the intelligent power module continuously according to the overcurrent level signal, so that the intelligent power module shutting off the output of a phase current;
- when the signal processing circuit outputting a latching cancel signal to the signal latching module, the signal latching module outputting a conventional level signal to the intelligent power module according to the latching cancel signal, the intelligent power module driving the compressor to operate according to the conventional level signal and a driving signal outputted by the signal processing circuit.

12. The air conditioner according to claim 11, wherein the signal latching module comprises a latch, a latching-controlling circuit, the latch comprises a signal input pin, a signal output pin and a signal control pin, the signal input pin of the latch is defined as the input end of the signal latching module, the signal output pin is defined as the output end of the signal latching module; the latching-controlling circuit comprises a first input end, a second input end and an output end, and the first input end of the latching-controlling circuit is connected with the signal input pin of the signal latching module, the second input end of the latching-controlling circuit is defined as the latching-controlling end of the signal latching module, the output end of the latching-controlling circuit is connected with signal control pin of the latch.

13. The air conditioner according to claim 12, wherein the latching controlling circuit comprises:
- a first resistor R1, a second resistor R2, a third resistor R3, a fourth resistor R4, a first transistor Q1;
- a first end of the second resistor R2 is connected with the signal output pin of the latch, a first end of the third resistor R3 is connected with the signal processing circuit, a second end of the second resistor R2 and a second end of the third resistor R3 and a first end of the fourth resistor R4 are jointly connected with a base of the first transistor Q1, a second end of the fourth resistor R4 and an emitter of the first transistor Q1 are jointly grounded, a collector of the first transistor Q1 and a first end of the first resistor R1 are jointly connected with the signal control pin of the latch, a second end of the first resistor R1 is connected with a direct current power.

14. The air conditioner according to claim 12, wherein the latching control circuit comprises:
- a nand gate, a second transistor Q2, a first resistor R1, a fifth resistor R5, a sixth resistor R6, a seventh resistor R7, a eighth resistor R8;
- a first end of the fifth resistor R5 is connected with the signal output pin of the latch, a second end of the fifth resistor R5 is connected with a first input end of the nand gate; a first end of the sixth resistor R6 is connected with the signal processing circuit, a second end of the sixth resistor R6 and a first end of the seventh resistor R7 are jointly connected with a base of the second transistor Q2, a second end of the seventh resistor R7 and an emitter of the second transistor Q2 are jointly grounded, a collector of the second transistor Q2 and a first end of the resistor R8 are jointly connected with a second input end of the nand gate, a second end of the resistor R8 is connected with a direct current power; an output end of the nand gate and a first end of the resistor R1 are jointly connected with the signal control pin of the latch, a second end of the resistor R1 is connected with the direct current power.

15. The air conditioner according to claim 12, wherein the latching control circuit comprises:
- a first resistor R1, a ninth resistor R9, a tenth resistor R10, an eleventh resistor R11, a twelfth resistor R12, a third transistor Q3, a fourth transistor Q4; a first end of the tenth resistor R10 is connected with the signal processing circuit, a second end of the tenth resistor R10 and a first end of the eleventh resistor R11 are jointly connected with the a base of the third transistor Q3, a first end of the ninth resistor R9 is connected with the output pin of the latch, a second end of the ninth resistor R9, a collector of the third transistor Q3 and a first end of the twelfth resistor R12 are jointly connected with a base of the fourth transistor Q4, a second end of the eleventh resistor R11, an emitter of the third transistor Q3, a second end of the twelfth resistor R12 and an emitter of the fourth transistor Q4 are jointly grounded, a collector of the fourth transistor Q4 and a first end of the first resistor R1 are jointly connected with the signal control pin of the latch, a second end of the first resistor R1 is connected with a direct current power.

16. The air conditioner according to claim 12, wherein the latching control circuit comprises:

a first resistor R1, a thirteenth resistor R13, a fourteenth resistor R14, a fifteenth resistor R15, a fifth transistor Q5, an inverter;

a first end of the fourteenth resistor R14 is connected with the signal processing circuit, a second end of the fourteenth resistor R14 and a first end of the fifteenth resistor R15 are jointly connected with the a base of the fifth transistor Q5, a second end of the fifteenth resistor R15 and an emitter of the fifth transistor Q5 are jointly grounded, a first end of the thirteenth resistor R13 is connected with the signal output pin of the latch, a second end of the thirteenth resistor R13 and a collector of the fifth transistor Q5 are jointly connected with an input end of the inverter, an output end of the inverter and a first end of the first resistor R1 are jointly connected with the signal control pin of the latch, a second end of the first resistor R1 is connected with a direct current power.

17. The air conditioner according to claim 12, wherein the latching control circuit comprises:

a first resistor R1, a sixteenth resistor R16, a seventeenth resistor R17, a eighteenth resistor R18, a nand gate;

a first end of the sixteenth resistor R16 is connected with the signal output pin of the latch, a second end of the sixteenth resistor R16 is connected with a first input end of the nand gate, a first end of the seventeenth resistor R17 is connected with the signal processing circuit, a second end of the seventeenth resistor R17 and a first end of the eighteenth resistor R18 are jointly connected with the a second input end of the nand gate, a second end of the eighteenth resistor R18 is grounded, an output end of the nand gate and a first end of the first resistor R1 are jointly connected with the signal control pin of the latch, a second end of the first resistor R1 is connected with a direct current power.

18. The air conditioner according to claim 11, wherein the compressor protection circuit further comprises a signal shaping module, an input end and an output end of the signal shaping module are connected with the output end of the voltage comparison module and the input end of the signal latching module respectively, at an initial time of powering the processor protection circuit, the signal shaping module outputs the overcurrent level signal by itself and controls the intelligent power module to shut off the output of the phase current through the signal latching module, and after the voltage comparison module outputs the overcurrent level signal or the conventional level signal, the signal shaping module shapes the overcurrent level signal or the conventional level signal outputted by the voltage comparison module and then outputs the shaped overcurrent level signal or the shaped conventional level signal to the signal latching module.

19. The air conditioner according to claim 18, wherein the signal shaping module comprises:

a nineteenth resistor R19, a twentieth resistor R20 and a sixth transistor Q6;

a joint point of a first end of the nineteenth resistor R19 and a base of a second PNP transistor Q6 is defined as an input end of a second signal shaping module, a second end of the nineteenth resistor R19 and a first end of the twentieth resistor R20 are jointly connected with a direct current power, a joint point of a second end of the twentieth resistor R20 and an emitter of the PNP transistor Q6 is defined as an output end of the second signal shaping module, a collector of the sixth transistor Q6 is grounded.

20. The air conditioner according to claim 18, wherein the voltage comparison module comprises: a twenty-first resistor R21, a twenty-second resistor R22, a twenty-third resistor R23, a first comparator1, a twenty-fourth resistor R24;

a first end of the twenty-first resistor R21 and a first end of the twenty-second resistor R22 are defined as the first input end and the second input end of the voltage comparison module respectively, a second end of the twenty-first resistor R21 is connected with an in-phase input end of the first comparator, a second end of the twenty-second resistor R22 and a first end of the twenty-third resistor R23 are jointly connected with an anti-phase input end of the first comparator, a positive power end of the first comparator is connected with a direct current power, a negative power end of the first comparator and a second end of the twenty-third resistor R23 are jointly grounded, an output end of the first comparator is connected with a first end of the twenty-fourth resistor R24, a second end of the twenty-fourth resistor R24 is the output end of the voltage comparison module.

* * * * *